US011477344B2

(12) United States Patent
Suzuki

(10) Patent No.: US 11,477,344 B2
(45) Date of Patent: Oct. 18, 2022

(54) INFORMATION PROCESSING APPARATUS, METHOD OF CONTROLLING THE SAME, AND STORAGE MEDIUM

(71) Applicant: Canon Kabushiki Kaisha, Tokyo (JP)

(72) Inventor: Takahiro Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/315,755

(22) Filed: May 10, 2021

(65) Prior Publication Data

US 2021/0352190 A1 Nov. 11, 2021

(30) Foreign Application Priority Data

May 11, 2020 (JP) .............................. JP2020-083363

(51) Int. Cl.
*G06F 15/00* (2006.01)
*G06K 1/00* (2006.01)
*G06K 15/00* (2006.01)
*H04N 1/44* (2006.01)
*H04N 1/32* (2006.01)
*H04N 1/00* (2006.01)

(52) U.S. Cl.
CPC ......... *H04N 1/4406* (2013.01); *H04N 1/0097* (2013.01); *H04N 1/32096* (2013.01); *H04N 2201/0094* (2013.01)

(58) Field of Classification Search
CPC ............... H04N 1/4406; H04N 1/0097; H04N 1/32096; H04N 2201/0094
USPC ............................. 358/1.1, 1.15, 1.14, 1.13
See application file for complete search history.

(56) References Cited

U.S. PATENT DOCUMENTS

| 11,226,720 B1* | 1/2022 | Vandivere ............. G06F 3/0482 |
| 11,275,493 B1* | 3/2022 | Darmour ................ G06N 20/00 |
| 2021/0019376 A1* | 1/2021 | Neubauer ............ G08G 1/0129 |
| 2021/0233148 A1* | 7/2021 | Govindan .......... G06Q 30/0643 |
| 2021/0271956 A1* | 9/2021 | Wang .................... G06K 9/6231 |

FOREIGN PATENT DOCUMENTS

| JP | 2009116680 A | 5/2009 |
| JP | 2018069684 A | 5/2018 |
| JP | 2019057819 A | 4/2019 |
| JP | 2019168590 A | 10/2019 |
| JP | 2020063429 A | 4/2020 |

* cited by examiner

*Primary Examiner* — Douglas Q Tran
(74) *Attorney, Agent, or Firm* — Venable LLP

(57) ABSTRACT

An information processing apparatus and a method of controlling the information processing apparatus are provided. The information processing apparatus stores a plurality of learned models, determines whether the stored plurality of learned models include confidential information, and presents, to a user, learned models of the plurality of learned models determined to include the confidential information.

14 Claims, 22 Drawing Sheets

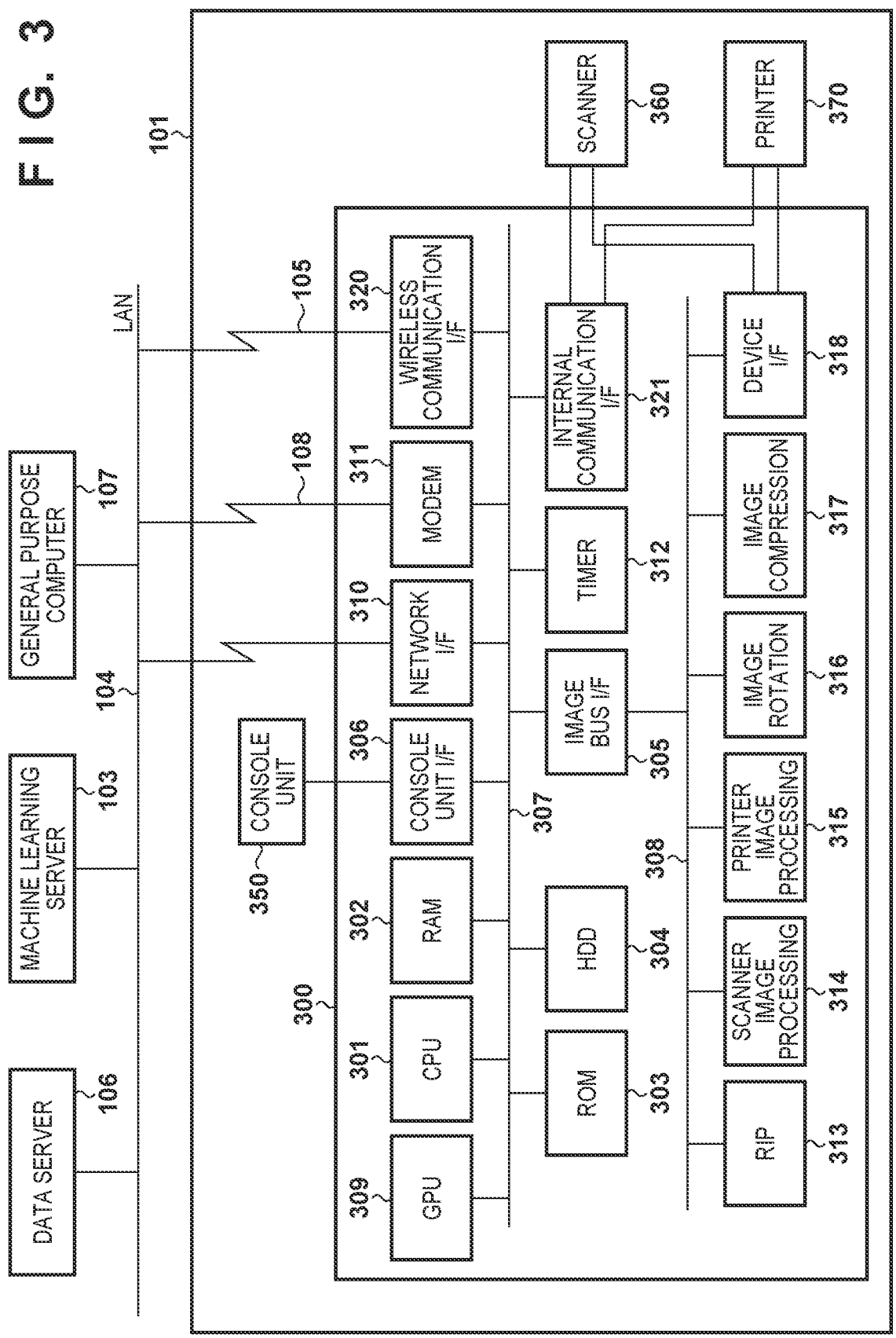

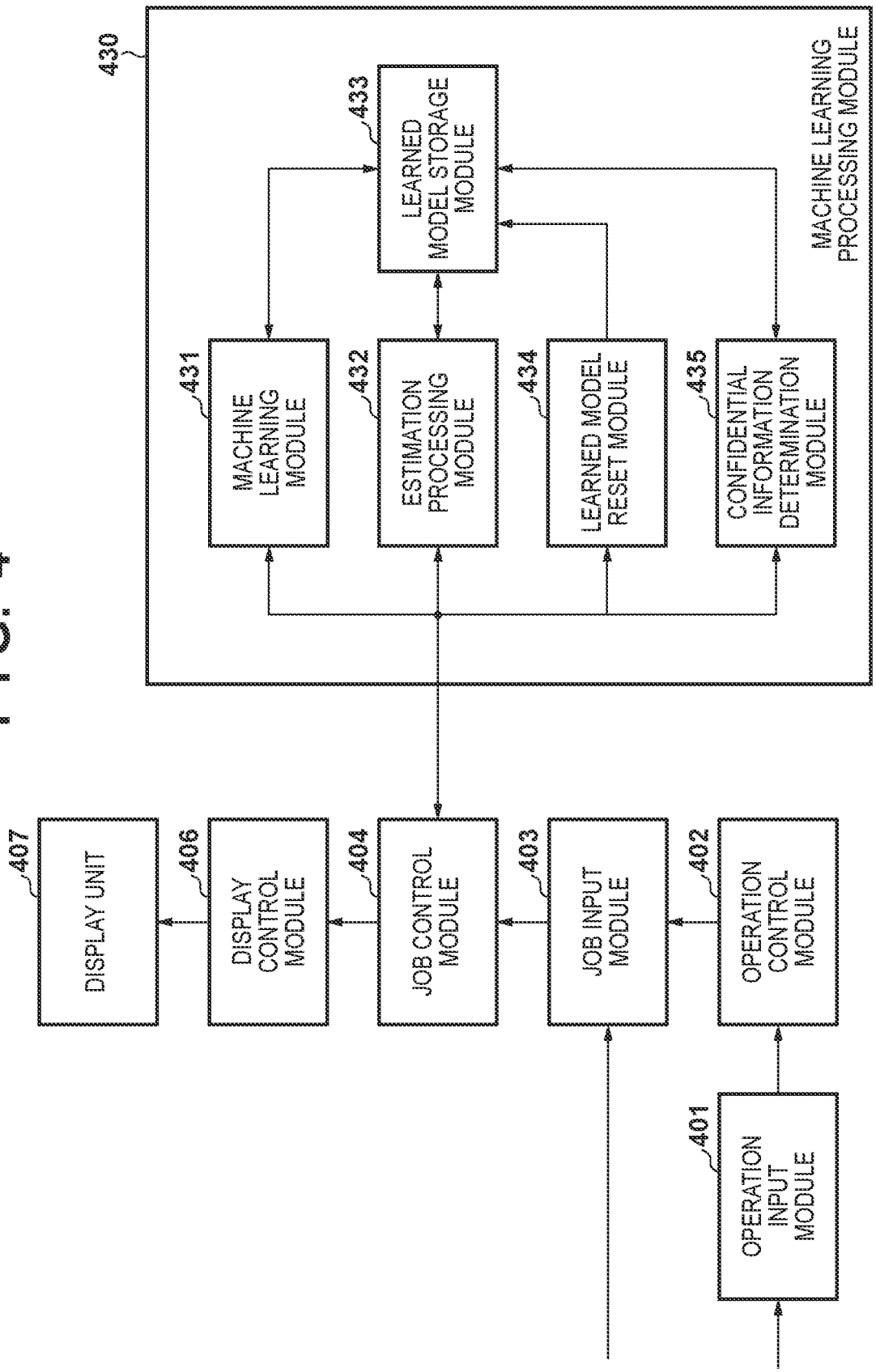

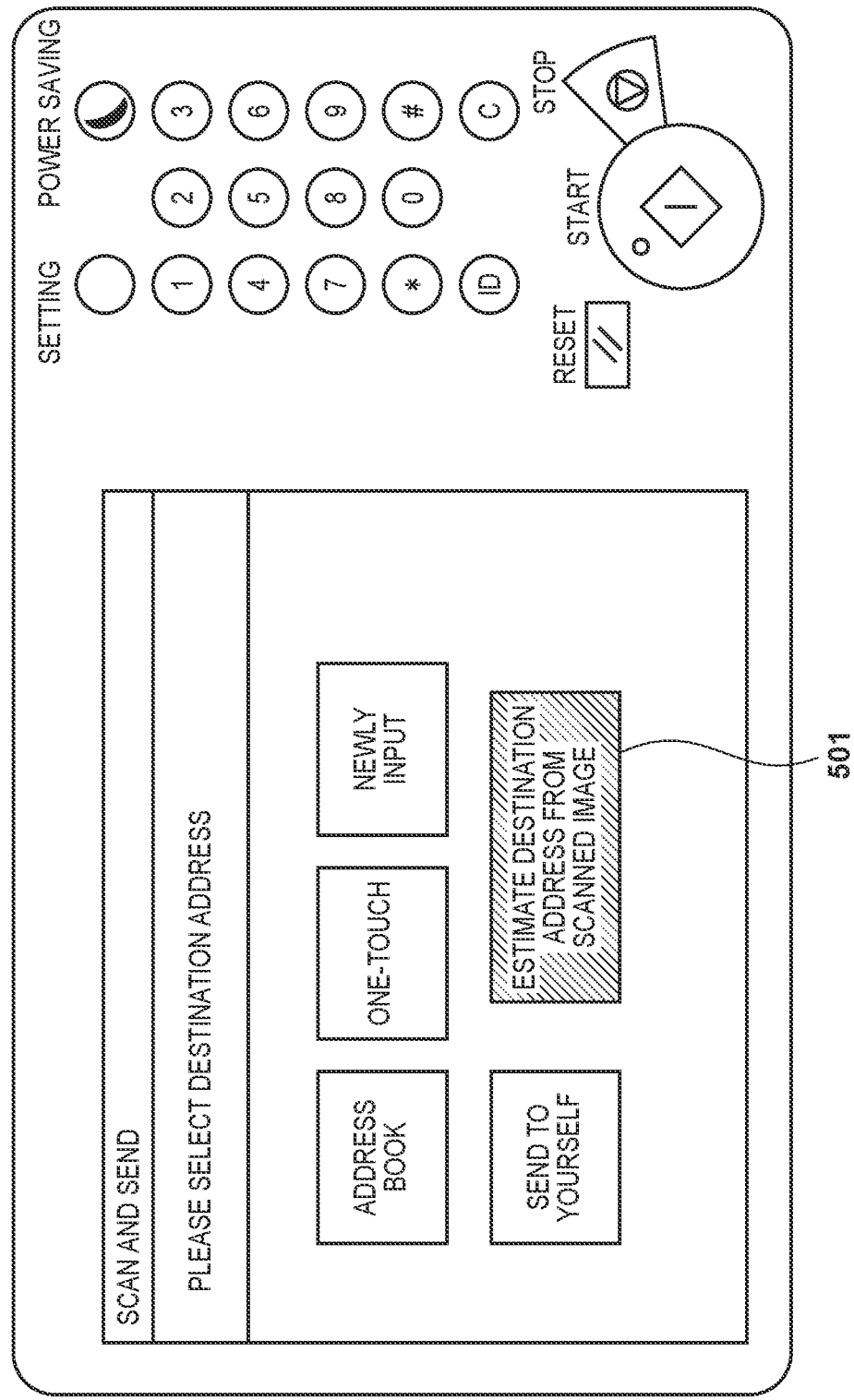

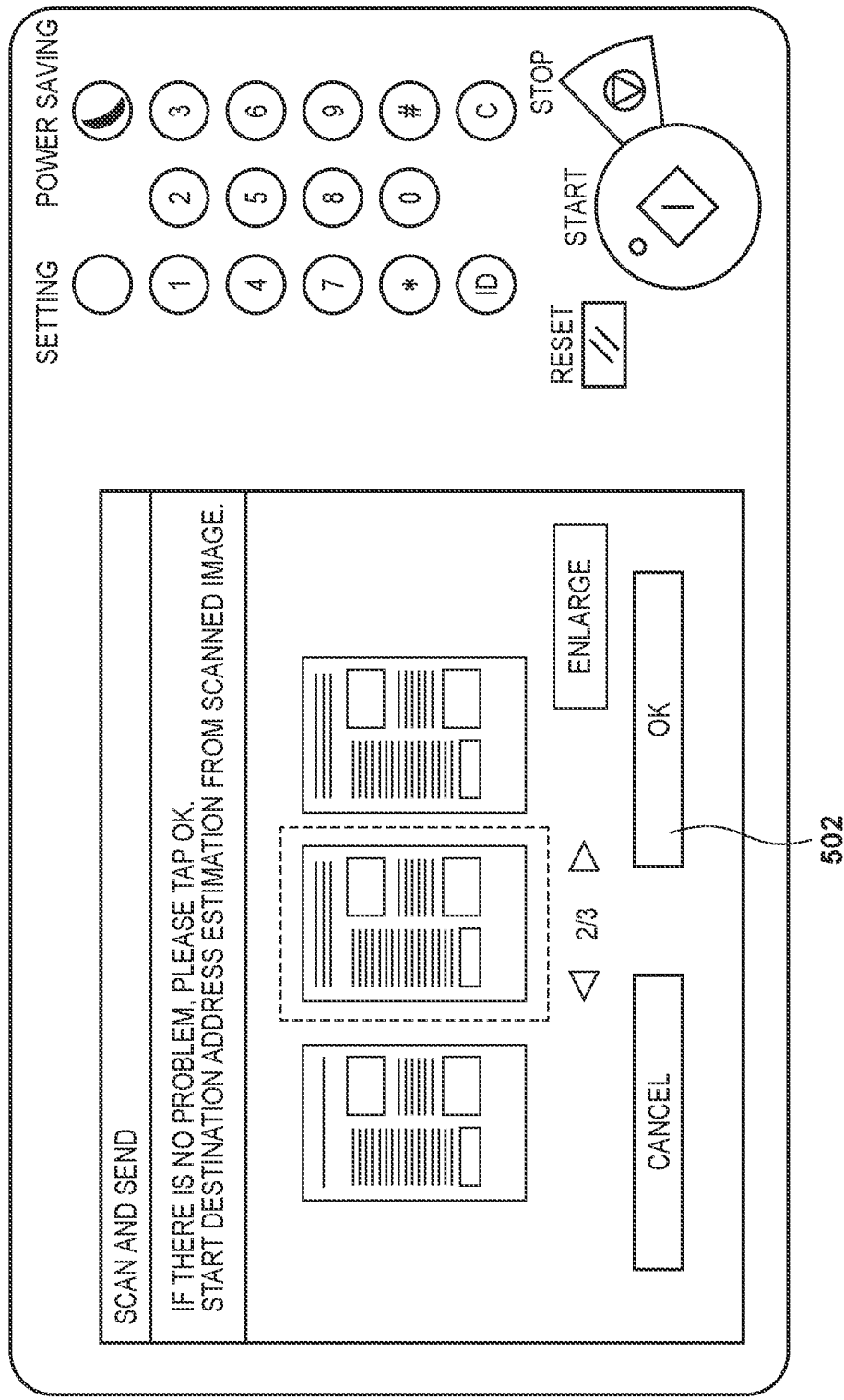

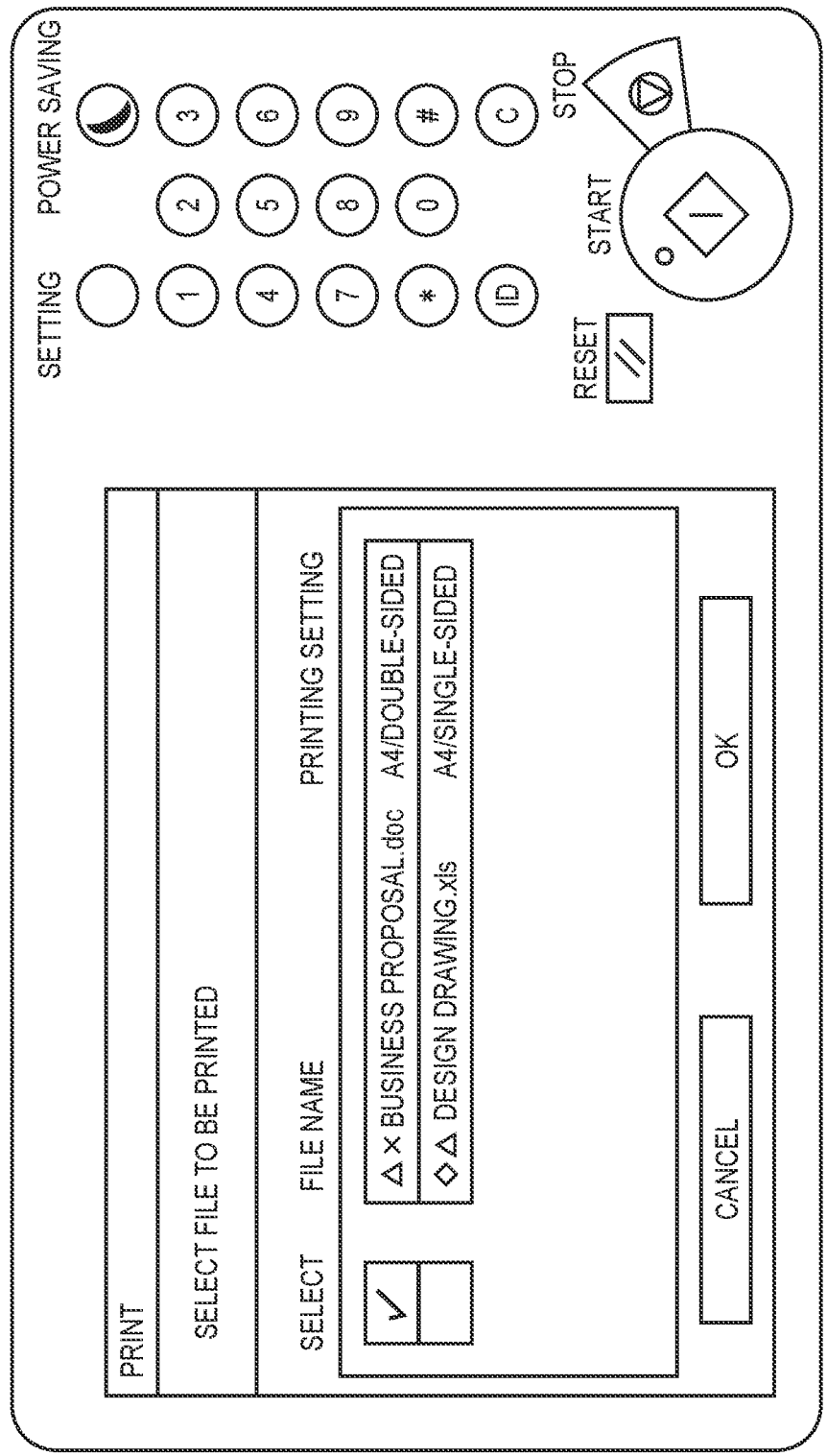

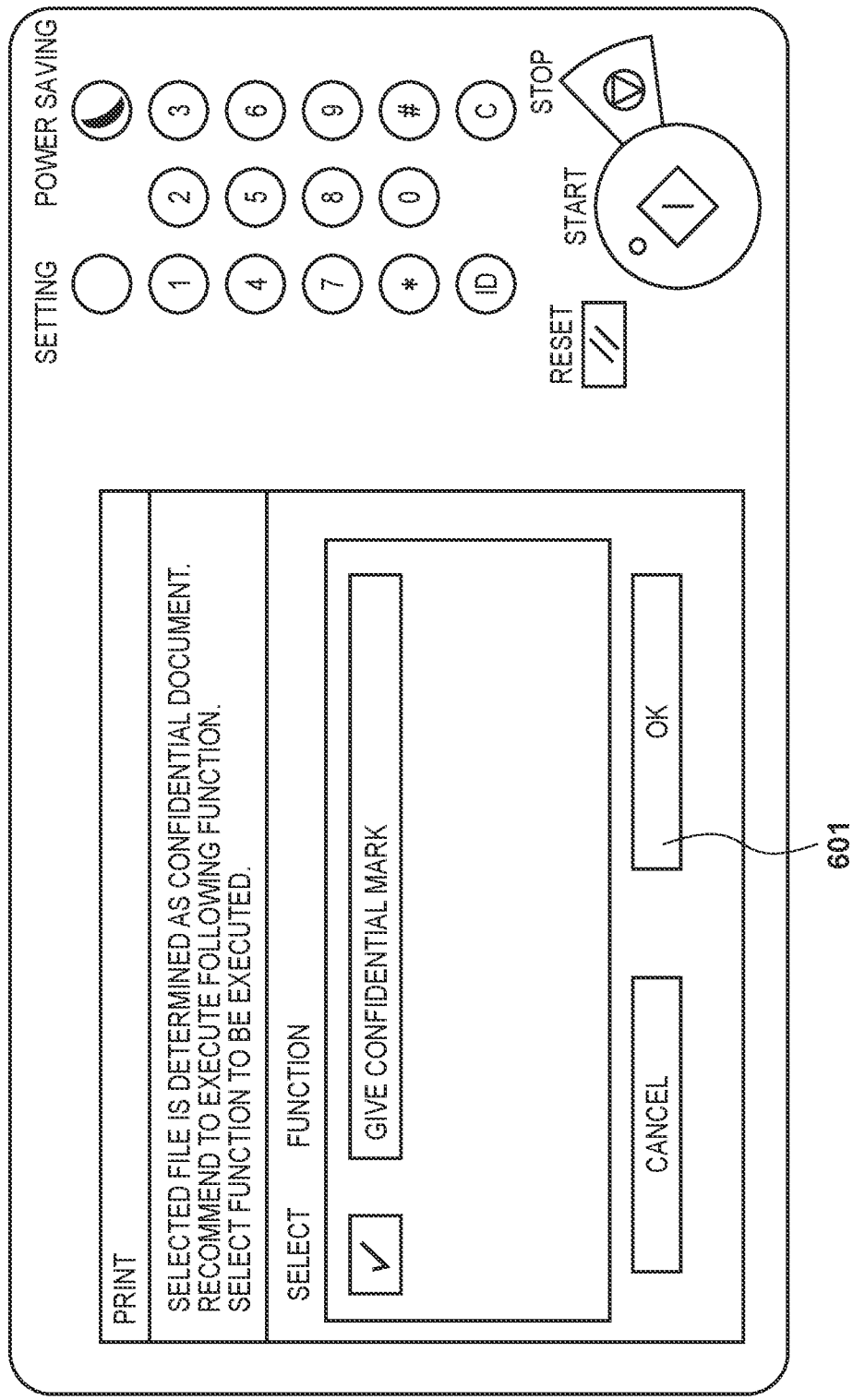

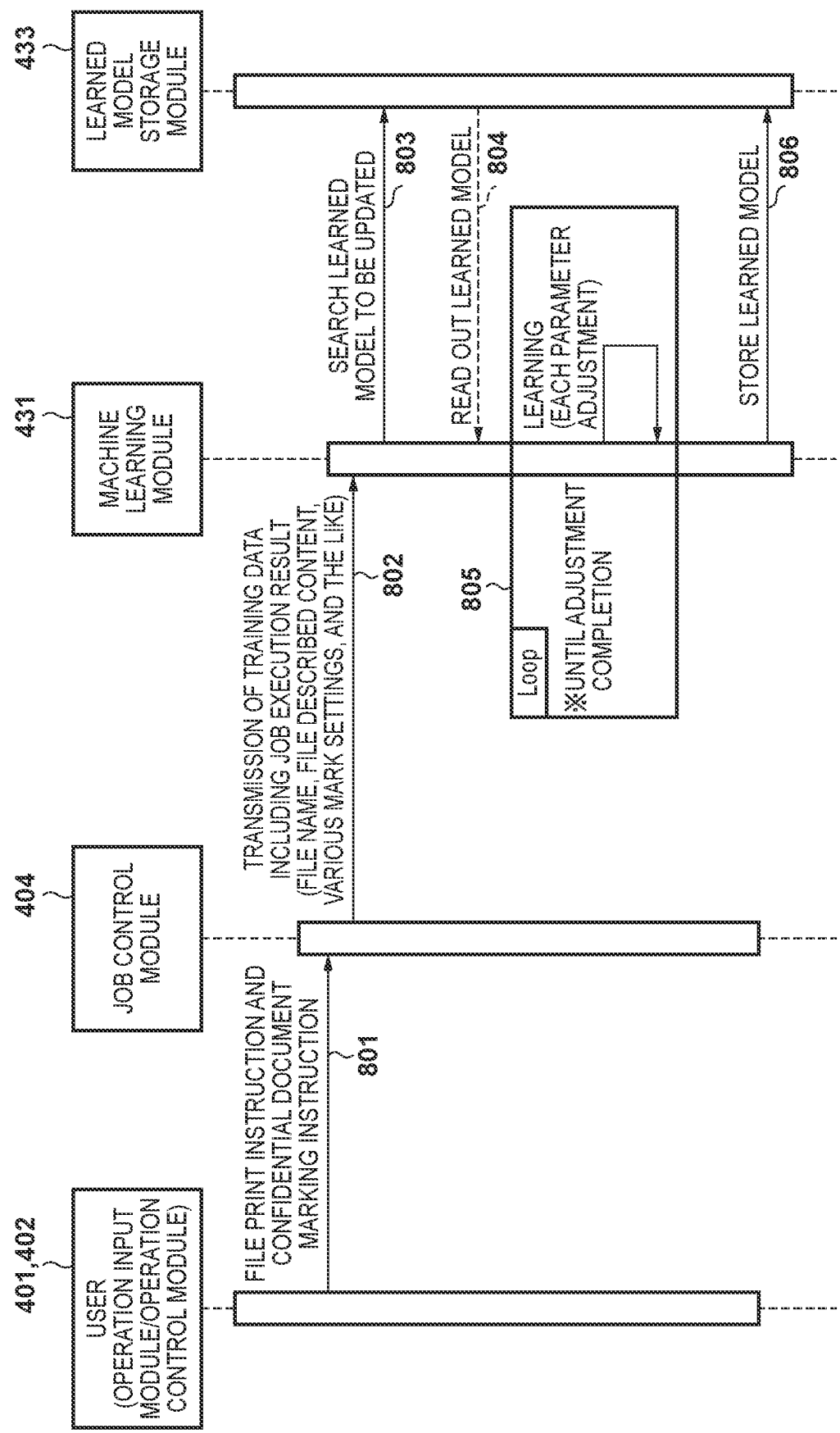

F I G. 9

| ESTIMATION FUNCTION | CONFIDENTIAL INFORMATION FLAG | INPUT INFORMATION | OUTPUT INFORMATION |
|---|---|---|---|
| SEND DESTINATION ADDRESS ESTIMATION | YES | CONFIDENTIAL | CONFIDENTIAL |
| CONFIDENTIAL DOCUMENT PRINTING ESTIMATION | YES | CONFIDENTIAL | - |
| QUERY CONTACT ESTIMATION | YES | CONFIDENTIAL | CONFIDENTIAL |
| ADDRESS ESTIMATION | YES | - | CONFIDENTIAL |
| PAPER REPLACEMENT TIME PERIOD ESTIMATION | - | CONFIDENTIAL | - |
| TONER REPLACEMENT TIME PERIOD ESTIMATION | - | CONFIDENTIAL | - |
| ERRONEOUS OPERATION CORRECTION ESTIMATION | YES | CONFIDENTIAL | - |
| ○○ ESTIMATION | - | - | - |

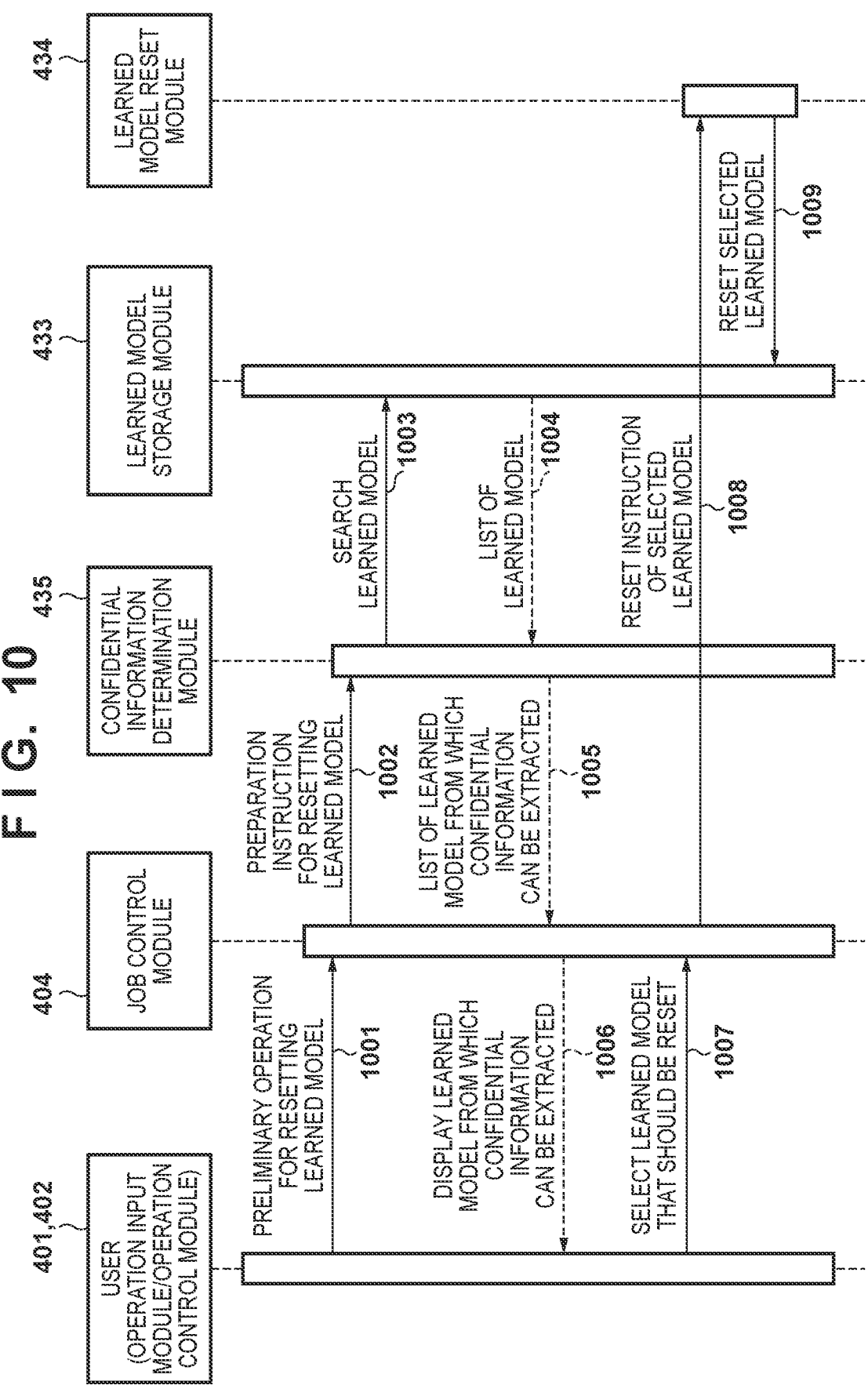

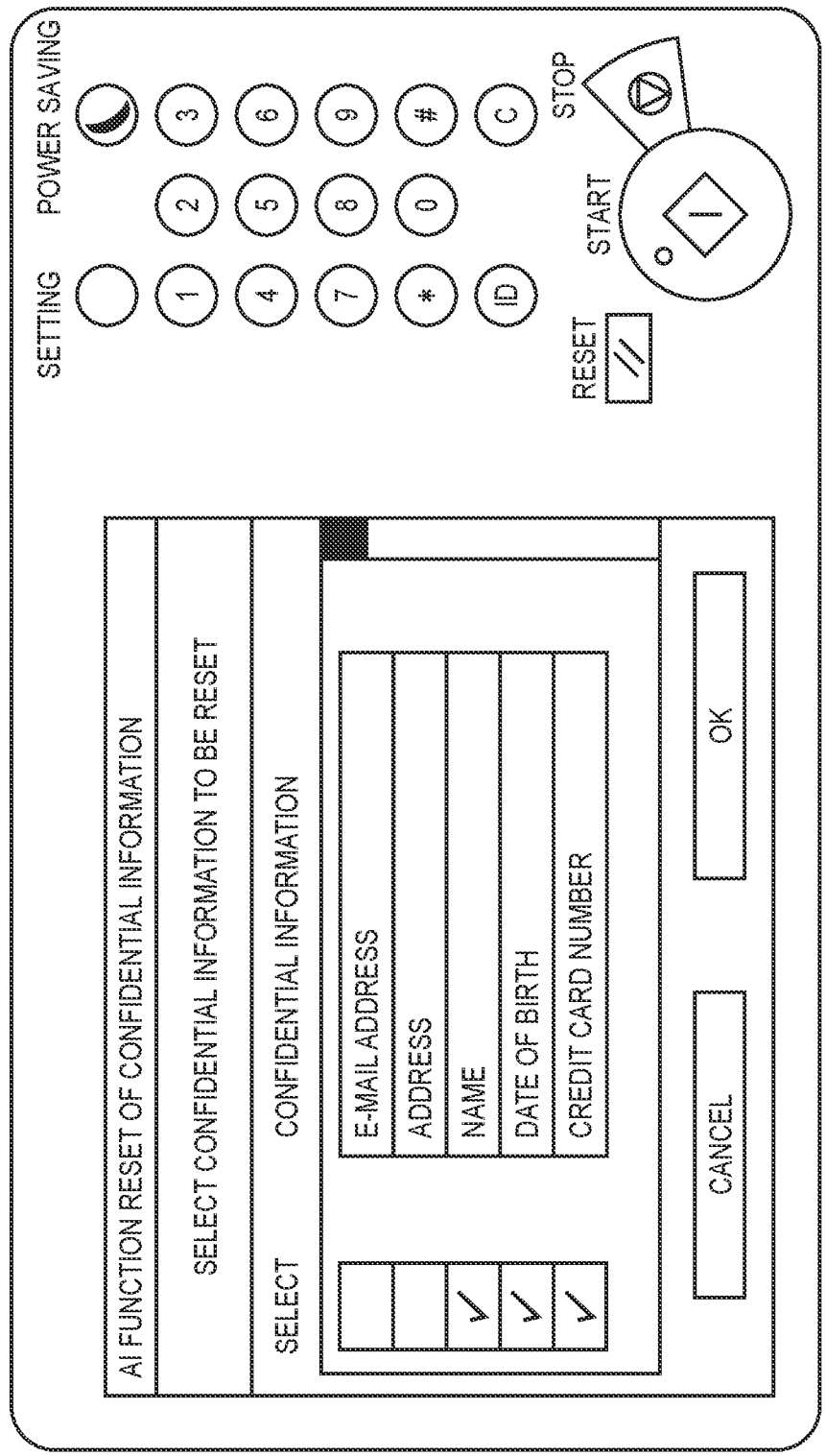

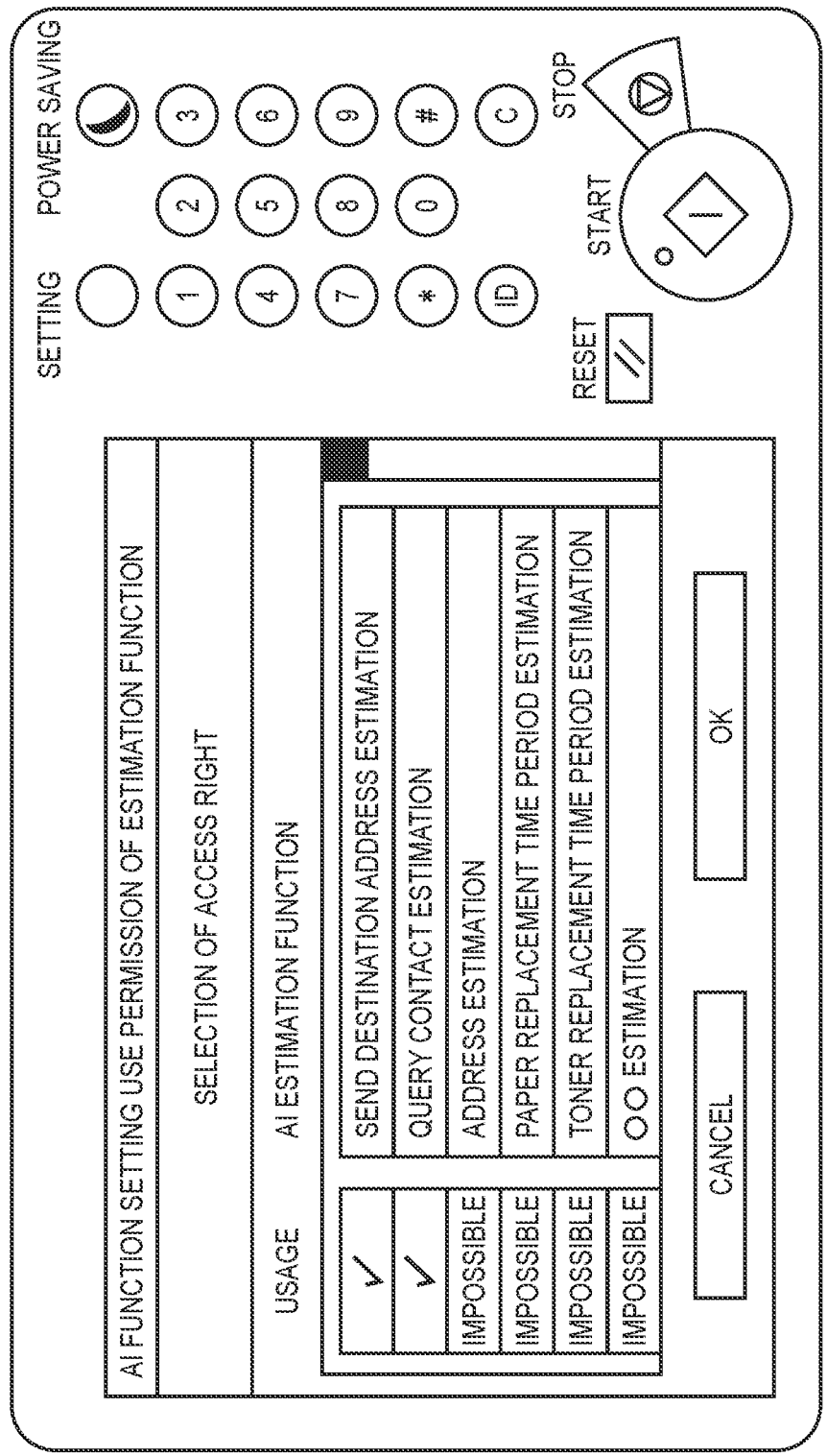
F I G. 15A

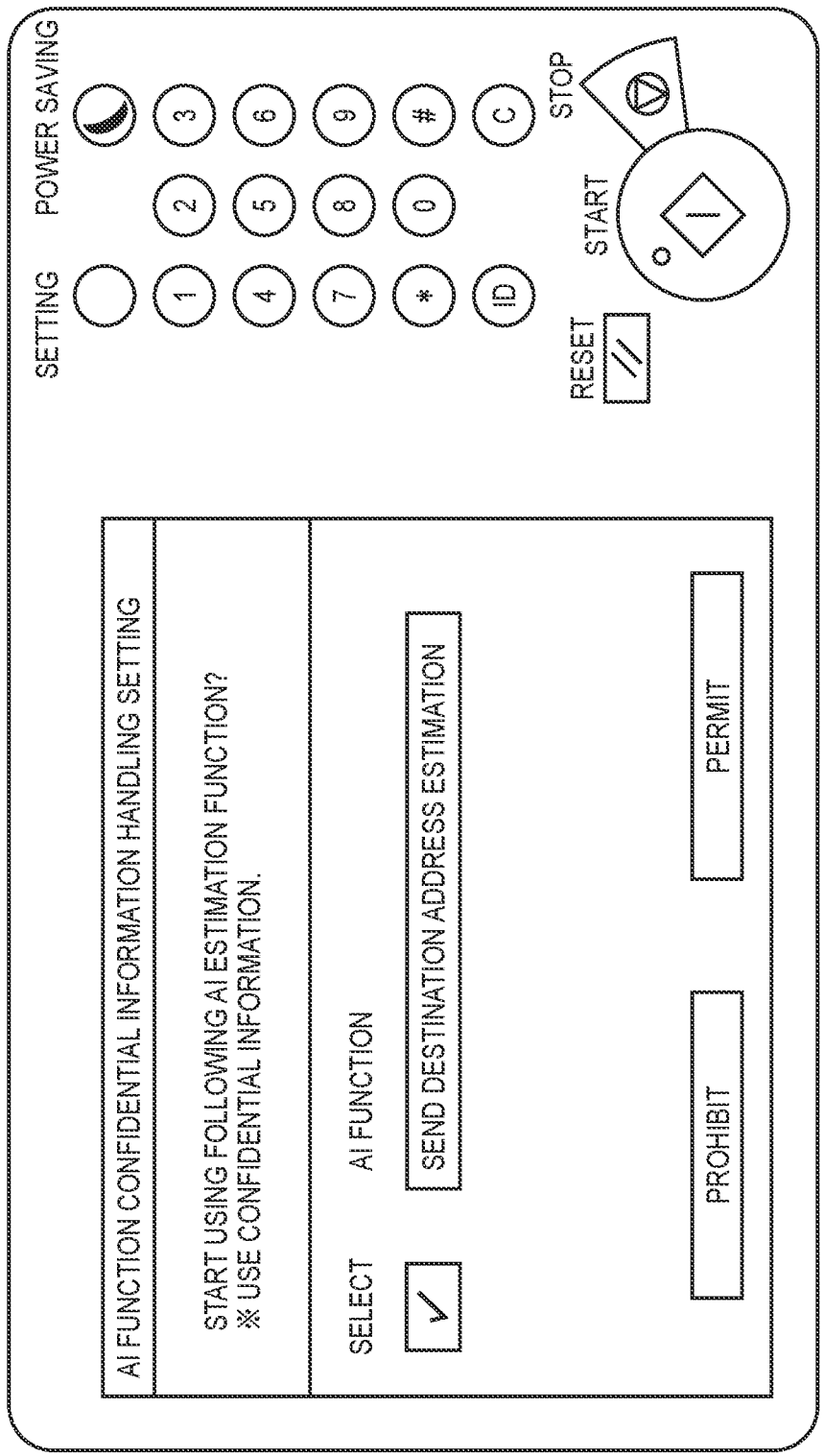

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a control method thereof, and a storage medium.

Description of the Related Art

As an image forming apparatus provided with a function of forming an image on a recording material such as paper, there is known a multifunction peripheral having a printer function, a facsimile function, a copy function, and the like. In such multifunction peripherals, various setting items are provided, and in some of the multifunction peripherals, a user can set a setting value to increase convenience. For example, in some of the multifunction peripherals, setting values of various settings items such as a frequently used printing setting, a menu icon arrangement configuration, or a destination address registration of an e-mail address or the like can be set. Further, a reset button may be provided to reset these setting values to be in a default state, Japanese Patent Laid-Open No. 2019-57819 describes, for example, a reset button that resets all setting values or a reset button that collectively resets setting values within a specific range.

In addition, there has been proposed a method for improving user convenience by using machine learning in a multifunction peripheral. For example, Japanese Patent Laid-Open No. 2018-69684 describes a technique in which a recommended setting for a print job is estimated by machine learning so that a recommendation of a setting that a user does not desire is not repeated, thereby improving accuracy of the recommendation.

In general, a learned model that outputs a specific estimated result from a plurality of pieces of input data is used for the estimation by machine learning. As the learned model, there is a learned model that uses confidential information such as personal information. For example, when a technical query contact related to a scanned image is estimated by machine learning to inform a user, "contact information", which is the confidential information, is required.

In the machine learning method using confidential information described above, there is a risk of the confidential information leakage through the learned model. As an example of such confidential information leakage, a case is conceivable in which a learned model is copied based on input data and output results, and the confidential information is leaked as a result.

SUMMARY OF THE INVENTION

An aspect of the present invention is to eliminate the above-mentioned problem with conventional technology.

A feature of the present invention is to provide a technique that can prevent confidential information from leaking through a learned model.

According to a first aspect of the present invention, there is provided an information processing apparatus, comprising: a storage that stores a plurality of learned models; and at least one processor and at least one memory being configured to cause the information processing apparatus to: determine whether the plurality of learned models stored in the storage include confidential information; and present, to a user, learned models of the plurality of learned models determined to include the confidential information.

According to a second aspect of the present invention, there is provided a method of controlling an information processing apparatus having a storage that stores a plurality of learned models, the method comprising: determining whether the plurality of learned models stored in the storage unit include confidential information; and presenting, to a user, learned models of the plurality of learned models determined to include the confidential information in the determining.

Further features of the present invention will become apparent from the following description of exemplary embodiments with reference to the attached drawings.

BRIEF DESCRIPTION OF IRE DRAWINGS

The accompanying drawings, which are incorporated in and constitute a part of the specification, illustrate embodiments of the invention and, together with the description, serve to explain the principles of the invention.

FIG. 3 is a block diagram for explaining a hardware configuration of an image forming apparatus according to the embodiment.

FIG. 4 is a functional block diagram for explaining a functional configuration of the image forming apparatus and the machine learning server according to the embodiment.

FIGS. 5A to 5C are diagrams illustrating an exemplary screen for displaying a destination address AI-estimated based on a scanned image when a scan transmission is selected in the image forming apparatus according to the embodiment.

FIGS. 6A to 6C are diagrams illustrating an example of a notification screen when a file to be printed is determined to be a confidential document by AI estimation when a print function is selected in the image forming apparatus according to the embodiment.

FIG. 8 is a sequence diagram for describing a learning sequence of a learned model when a scanned image is printed.

FIG. 9 is a diagram illustrating an example of a data table showing attributes of confidential information for each learned model stored in a learned model storage module according to the embodiment.

FIG. 10 is a sequence diagram for describing a reset sequence of a learned model in the communication system according to the embodiment.

FIG. 14B is a diagram illustrating an exemplary screen on which a list of categories of pieces of confidential information is displayed to allow a user to select a piece of the confidential information that may be extracted.

FIG. 15A is a diagram illustrating an exemplary screen for setting an access authority to a learned model.

FIG. 15B is a diagram illustrating an exemplary screen for notifying a user that a learned model is estimated to have confidential information that may be extracted before the user starts to use the learned model.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that in the embodiment, an example of an information processing apparatus according to the present invention will be described using an image forming apparatus as an example.

Figure 1:
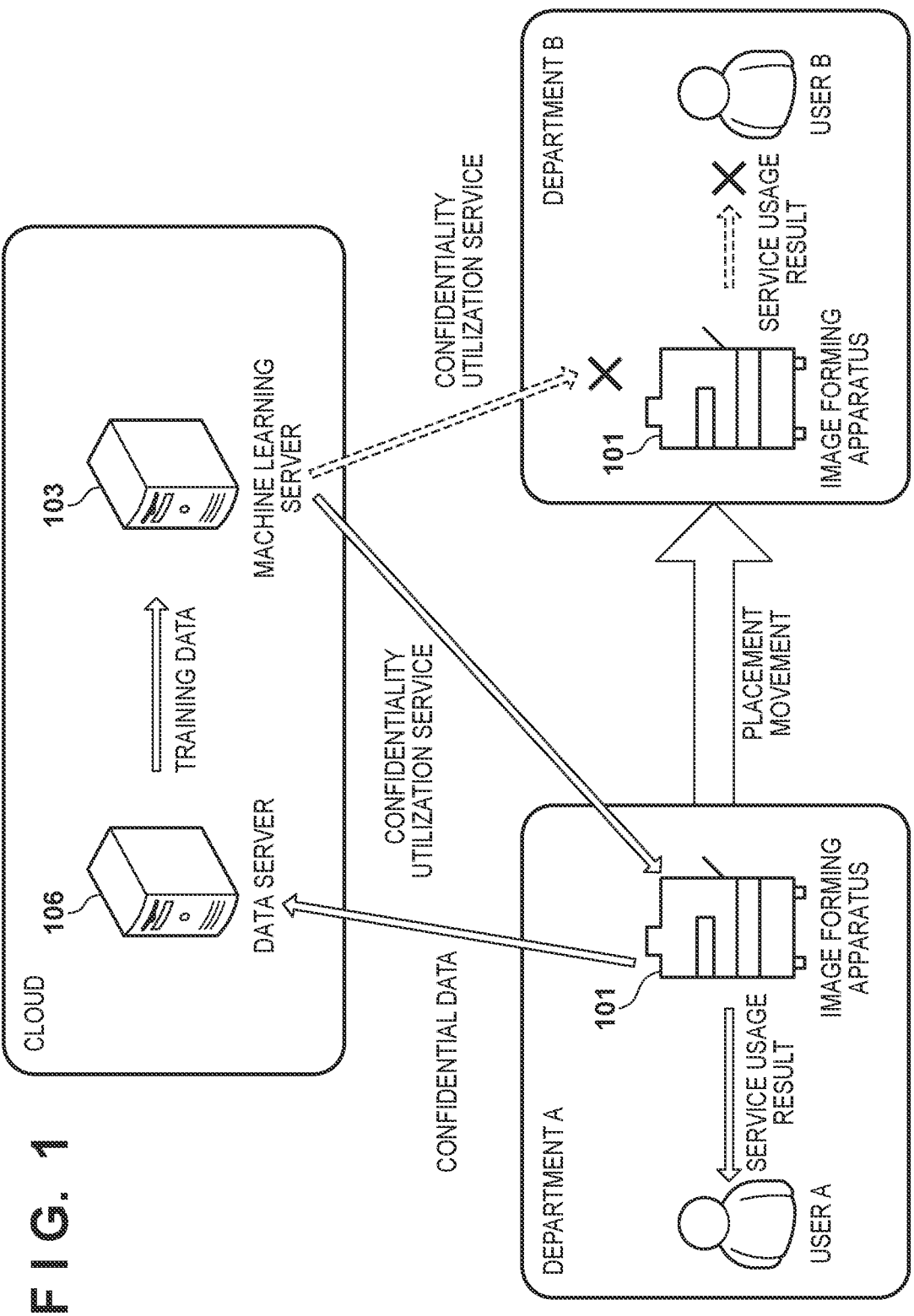
FIG. 1 is a diagram illustrating a configuration example of a communication system according to an embodiment of the present invention.

FIG. 1 is a diagram illustrating a configuration example of a communication system according to an embodiment of the present invention.

This communication system includes a plurality of image forming apparatuses and a plurality of servers. The image forming apparatuses 101 are multifunction peripherals each having a copy function, a facsimile transmission/reception function, a scan function, a box area function, a transmission function, a print function, and the like, and these are installed in accordance with an office environment. Of confidential data such as personal information stored in the image forming apparatus 101, data used for machine learning is transmitted to a data server 106 and stored in the data server 106. Furthermore, the confidential data is transmitted to a machine learning server 103 as training data. This training data is used for an AI estimation function. This AI estimation function is provided to the image forming apparatus 101 as a confidentiality utilization service.

A user A of a department A can use the AI estimation function by receiving a service usage result through the image forming apparatus 101. Alternatively, an access right to this confidentiality utilization service may be provided, such that a user who does not have the access right cannot use the confidentiality utilization service, thereby the risk of confidential information leakage can be reduced.

In the example of FIG. 1, the user A belonging to the department A is given the access right to the confidentiality utilization service and thus can use this confidentiality utilization service. Here, when a place of use of the image forming apparatus 101 moves to a department B (placement movement), a user B belonging to the department B is not given the access right to the confidentiality utilization service and thus the user B cannot use the confidentiality utilization service. In this way, confidential information in the department A is made inaccessible from the department B, so that the confidential information of the department A can be prevented from leaking to departments other than the department A.

Figure 2:
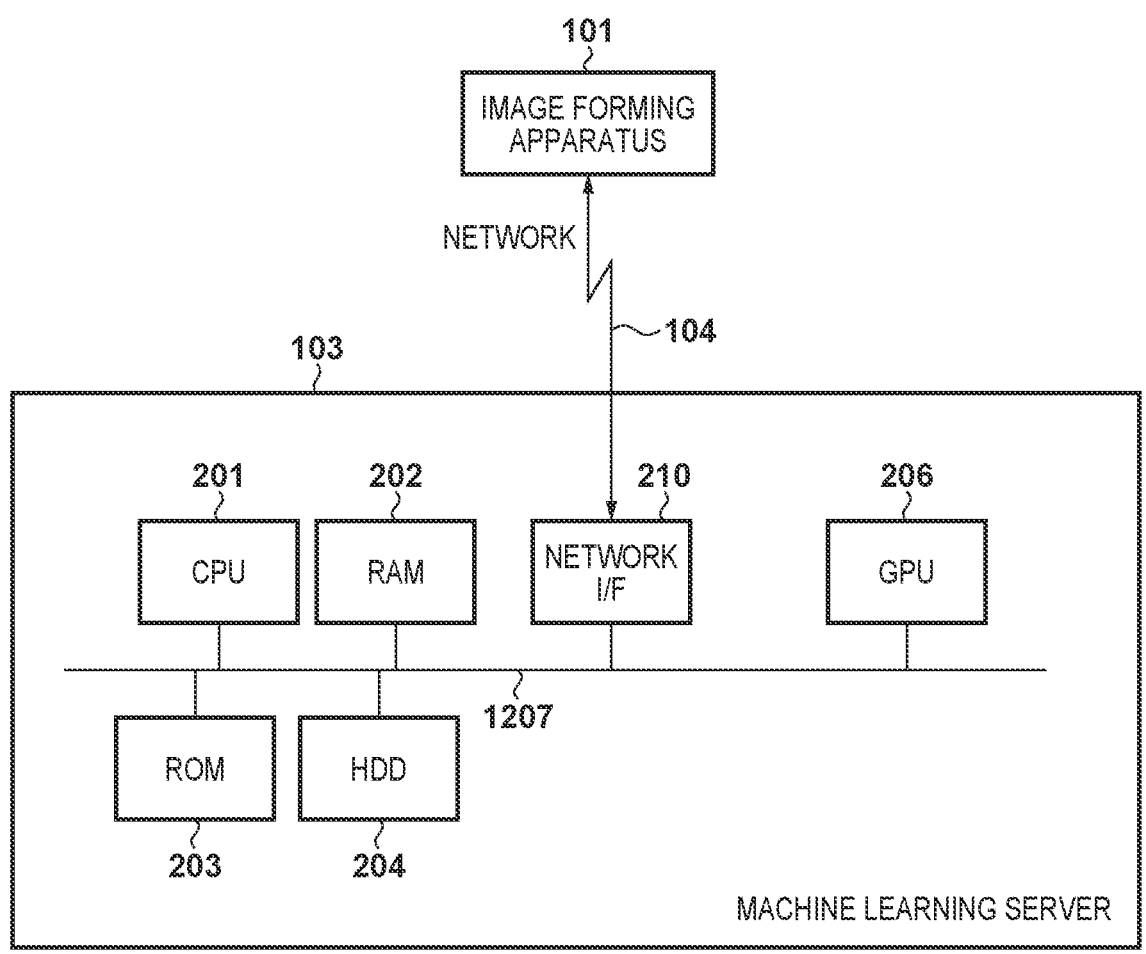
FIG. 2 is a block diagram for explaining a hardware configuration of a machine learning server according to the embodiment.

FIG. 2 is a block diagram for explaining a hardware configuration of the machine learning server 103 according to the embodiment.

The machine learning server 103 has a central processing unit (CPU) 201 as a controller that controls machine learning. A random access memory (RAM) 202 is a memory for an operation of the CPU 201, and is a memory for temporarily storing machine learning data. A network interface (I/F) 210 is connected to a local area network (LAN) 104 and performs communication (transmission and reception) with a general-purpose computer and other computer terminals (not illustrated) on the LAN 104. A read only memory (ROM) 203 stores a boot program or the like executed by the CPU 201. A hard disk drive (HDD) 204 stores system software, the machine learning data, and the like. A graphics processing unit (CPU) 206 performs arithmetic operation processing on the machine learning data. The CPU 201 deploys a program stored in the HDD 204 onto the RAM 202 and executes the program deployed onto the RAM 202 to control the machine learning server 103.

FIG. 3 is a block diagram for explaining a hardware configuration of the image forming apparatus 101 according to the embodiment.

The image forming apparatus 101 includes a controller 300 that controls the image forming apparatus 101, a console unit 350 for performing various operations by a user who uses the image forming apparatus 101, a scanner 360 that scans image information in accordance with an instruction from the console unit 350 and the like, and a printer 370 that prints image data on paper. The scanner 360 includes a CPU (not illustrated) that controls the scanner 360, an illumination lamp and a scanning mirror (not illustrated) for scanning an original document, and the like. The printer 370 includes a CPU (not illustrated) that controls the printer 370, and a photosensitive drum and a fixing unit (not illustrated) for image formation and fixing. The controller 300 is connected to the scanner 360, the printer 370, the LAN 104, a public communication line (wide area network (WAN)) 108, and a wireless LAN 105 to perform overall control of the operation of the image forming apparatus 101.

Next, the configuration of the controller 300 will be described in detail.

A raster image processor (RIP) 313 rasterizes a page description language (PDL) code included in a print job received from a general-purpose computer 107 on the LAN 104 via the LAN 104 into a bitmap image. A scanner image processing unit 314 corrects, processes, and edits image data input from the scanner 360. A printer image processing unit 315 performs correction, resolution conversion, and the like on image data to be output (printed) by the printer 370. An image rotation unit 316 rotates image data. An image compression unit 317 performs compression/decompression processing of joint photographic experts group (JPEG) method for multilevel image data, and performs compression/decompression processing of joint bi-level image experts group (JBIG) method, modified read (MMR) method, or modified Huffman (MU) method for binary image data. A device I/F 318 connects the scanner 360 and the printer 370 to the controller 300 to perform synchronous/asynchronous conversion of image data. An image bus 308 connects the units described above to each other to transfer image data at a high speed.

A CPU 301 functions as a controller that performs overall control of the image forming apparatus 101. The CPU 301 deploys a control program stored in an HDD 304 onto a RAM 302 and executes the deployed program to control the operation of the image forming apparatus 101. The RAM 302 is a system work memory for operation of the CPU 301, and is also an image memory for temporarily storing image data. A console unit I/F 306 is an interface unit to the console unit 350, outputs image data to be displayed on the console unit 350 to the console unit 350, and conveys, to the CPU 301, information input by a user who uses the image forming apparatus 101 from the console unit 350. A network I/F 310 is connected to the LAN 104 and performs communication (transmission and reception) with the general-purpose computer 107 and other computer terminals (not illustrated) on the LAN 104. Further, a modem 311 is connected to the public communication line 108 to communicate (transmit and receive) data with an external facsimile device (not illustrated). A wireless communication I/F 320 is connected to an external operation receiving device via the wireless LAN 105. A ROM 303 stores a boot program executed by the CPU 301 and various data. Further, the hard disk drive (HDD) 304 stores system software, image data, software counter values, and the like. An internal communication I/F 321 performs communication with the scanner 360 and the printer 370. An image bus I/F 305 is a bus bridge that connects a system bus 307 and the image bus 308 and converts a data structure. The controller 300 records and manages, as job log information at the time of job execution, output attribute information such as a user name, the number of print copies, and color printing, and the like at the time of print or copy job execution in the HDD 304 or the RAM 302. A GPU 309 uses setting information related to the job execution and image information as training data to perform arithmetic operation processing of machine learning. A timer 312 performs time measurement of a predetermined period in accordance with an instruction of the CPU 301, and notifies the CPU 301 by an interrupt or the like when a specified time elapses. The above-described units are connected to the CPU 301 via the system bus 307.

The configuration of the image forming apparatus 101 and the configuration of the controller 300 according to the embodiment have been described above. In addition, as a configuration for implementing the operation receiving device connected by the wireless LAN 105 according to the embodiment, the console unit of the image forming apparatus 101 may use a hardware resource of the controller 300 to take a role similar to that of the operation receiving device.

FIG. 4 is a functional block diagram for explaining a functional configuration of the image forming apparatus 101 and the machine learning server 103 according to the embodiment. With reference to FIG. 4, processing related to machine learning will be described.

A user manipulates the console unit 350 of the image forming apparatus 101 to input job data and setting data thereof to an operation input module 401, and the input data is sent to an operation control module 402 and then input to a job input module 403. In the job input module 403, data indicating a function of the image forming apparatus 101 is input from the data input by the user, and the job data and the setting values thereof are transmitted to a job control module 404.

A machine learning processing module 430 mainly performs machine learning, estimation processing, classification processing, and the like to implement a machine learning function with respect to data that is input and output by the image forming apparatus 101. In the configuration of the embodiment, the machine learning processing module 430 is included inside the machine learning server 103.

A learned model storage module 433 serves to store a learned model. Here, the learned model refers to a learning model in which parameter adjustment has been completed through a learning step.

First, a procedure in which a learned model is created will be described.

The job control module 404 transmits job data and setting values thereof to a machine learning module 431. The machine learning module 431 performs a learning step based on the received data to perform parameter adjustment of an associated learning model. The learning model in which the parameter adjustment has been completed by the machine learning module 431 is stored in the learned model storage module 433.

Next, a processing procedure when estimation processing is performed will be described.

The job control module 404 transmits the input job data and the setting data thereof to an estimation processing module 432. Then, the estimation processing module 432 inputs the job data and the setting data thereof to the learned model stored in the learned model storage module 433, and obtains output data indicating an estimated result. This estimated result is transmitted to the job control module 404 and displayed on a display unit 407 via a display control module 406, so that the user is notified of the estimated result. The display unit 407 is included in the console unit 350 of the image forming apparatus 101.

Examples of AI estimation utilization will now be described with reference to FIGS. 5A to 5C, and FIGS. 6A to 6C.

As one example, there is conceivable a utilization example in which when scanned image data is transmitted to a destination address after a sheet of paper is scanned, a described content included in the scanned image is extracted, and a destination address expected from the described content is estimated by an AI function to notify a user of the estimation result.

Figure 5C:
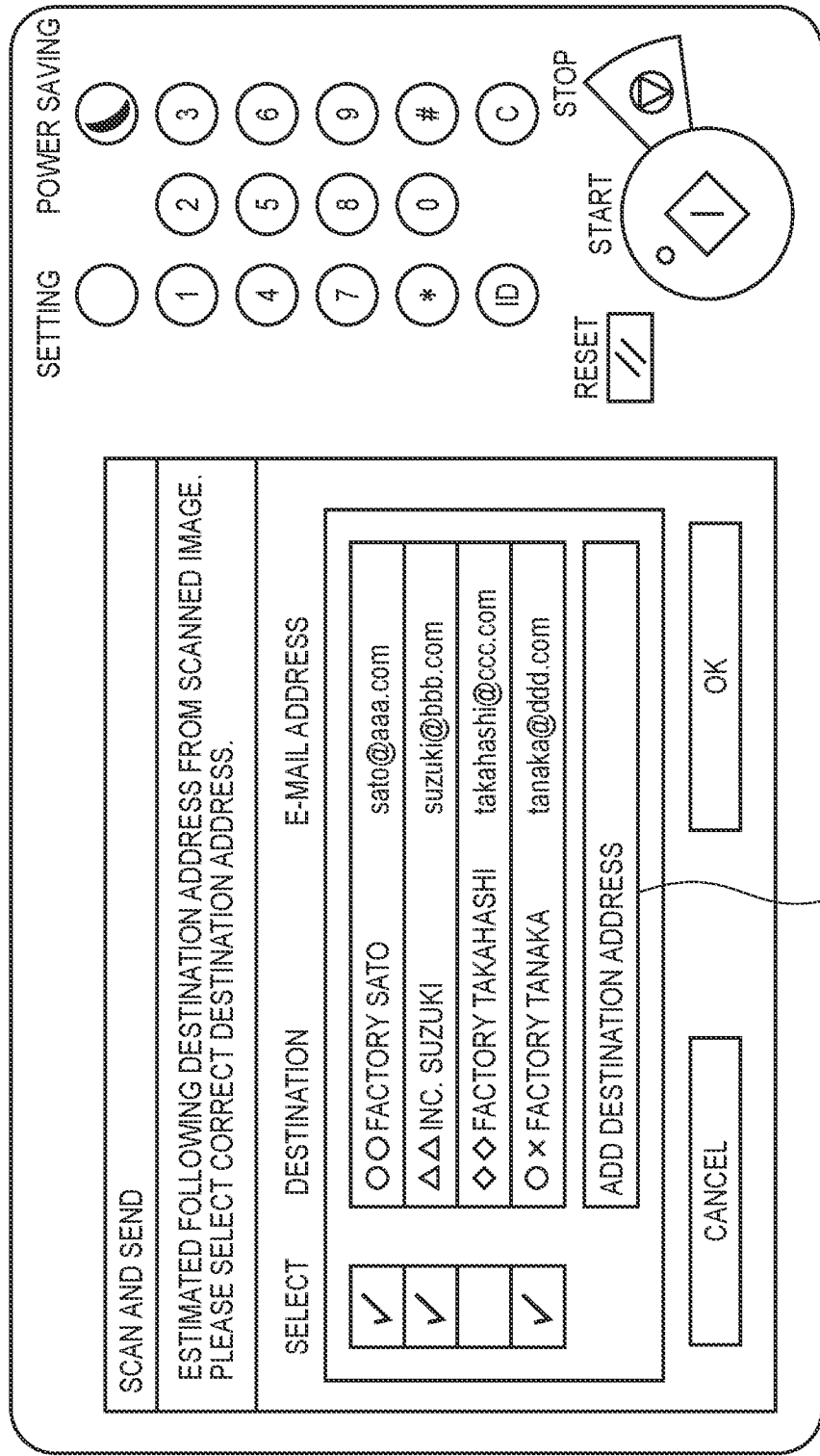

FIGS. 5A to 5C are diagrams illustrating an exemplary screen for displaying a destination address AI-estimated based on a scanned image when a scan transmission is selected in the image forming apparatus 101 according to the embodiment. These screens are displayed on the display unit 407 of the console unit 350.

The user taps an "ESTIMATE DESTINATION ADDRESS FROM SCANNED IMAGE" icon 501 on the screen illustrated in FIG. 5A. As a result, the image forming apparatus 101 causes the scanner 360 to scan an original document and obtains image data of the original document. The image forming apparatus 101 causes a preview image of the original document thus obtained to be displayed on the display unit 407 of the console unit 350, for example, as illustrated in FIG. 5B. In FIG. 5B, an example is illustrated in Which three sheets of the original document are scanned. Here, the user determines that the scanned image has no problem and taps an OK button 502. The image forming apparatus 101 then estimates, based on the contents of the scanned image data, a destination address likely to be the transmission destination, and causes a destination address selection screen including a plurality of destination address candidates to be displayed on the display unit 407, for example, as illustrated in FIG. 5C. The user can select an appropriate one or more destination addresses from the selection screen. In the example of FIG. 5C, three destination addresses have been selected. A button 503 for adding a destination address not included in the destination address candidates may also be provided.

Furthermore, there is conceivable a utilization example in which when a file received from the general-purpose computer 107 or the like is printed, whether a content of the file is a confidential document is estimated by the AI function, and if it is estimated to be a confidential document, a mark indicating that it is a confidential document is added to a printed material.

Figure 6C:
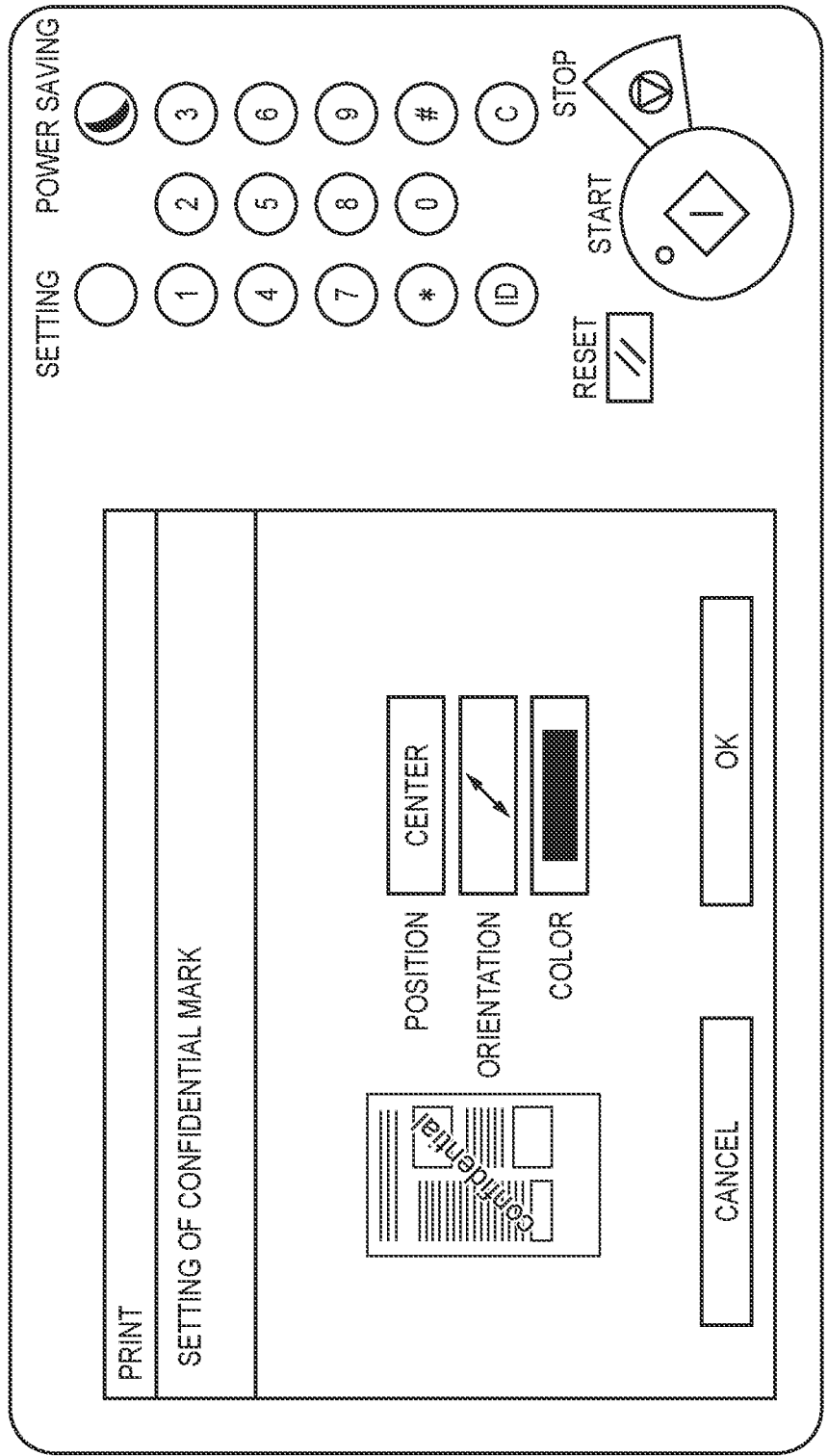

FIGS. 6A to 6C are diagrams illustrating an example of a notification screen when a file to be printed is determined to be a confidential document by AI estimation when a print function is selected in the image forming apparatus 101 according to the embodiment.

The user selects the file to be printed on the screen illustrated in FIG. 6A, In FIG. 6A, a business proposal is selected. In FIG. 6B, whether the file is a confidential document based on the content of the selected file is estimated. When it is estimated to be a confidential document, the user is queried whether to add a mark (confidential mark) to the printed material indicating that it is confidential. When the user determines to add the mark and taps an OK button 601, a screen that allows the user to set a display configuration (position, orientation, color, and the like) of the confidential mark, as illustrated in FIG. 6C, is caused to be displayed on the display unit 407.

Next, the learning step in the machine learning server 103 will be described in learning sequence diagrams of FIGS. 7 and 8.

Figure 7:
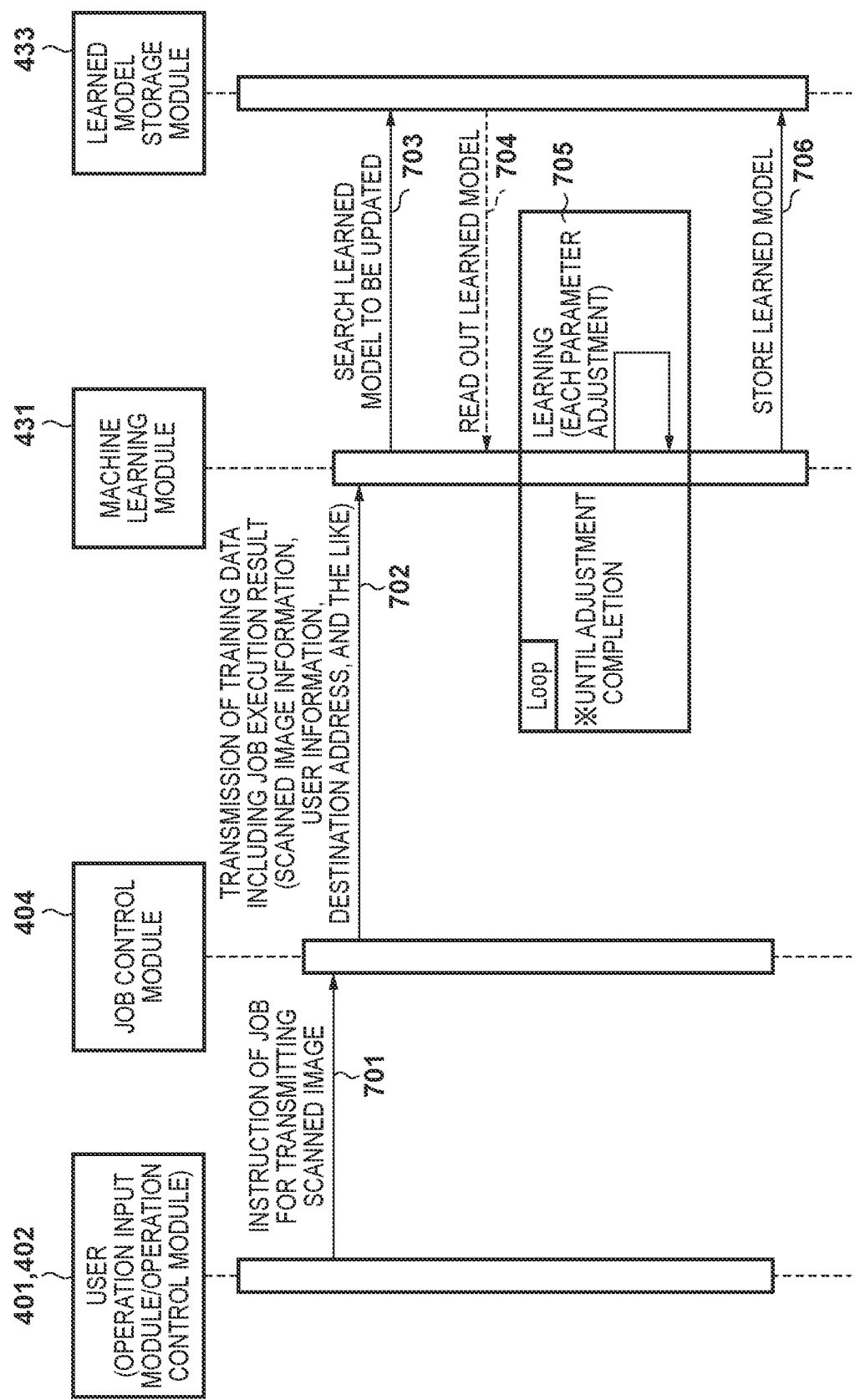
FIG. 7 is a sequence diagram for describing a learning sequence of a learned model when a scanned image is transmitted.

FIG. 7 is a sequence diagram for describing a learning sequence of a learned model when a scanned image is transmitted.

First, at reference numeral 701, an instruction of a job for transmitting a scanned image is input from a user via the console unit 350 of the image forming apparatus 101. This causes the job control module 404 to execute the instructed job at reference numeral 702 and send training data including an execution result of the job to the machine learning module 431. Here, the training data includes user information of the user that has instructed the job, an output result including a destination address of a scanned image, and input data required to estimate the output result. Then, the machine learning module 431 searches for and determines, at reference numeral 703, a learned model to be updated associated with the job from among learned models stored in the learned model storage module 433. At reference numeral 704, the learned model to be updated is read out. At reference numeral 705, the machine learning module 431 performs parameter adjustment (that is, learning) of the learned model. When the adjustment has been completed in this way, the updated learned model is stored in the learned model storage module 433 at reference numeral 706.

In the example of FIG. 7, learning is performed by using scanned image information (scanned image data) and user information of the user that has instructed the execution of the job as input data, and a destination address that has been actually set as output data. By the learning, the scanned image information and the user information are input as input data to the learned model in which the parameter adjustment has been completed, so that it is possible to estimate the transmission destination of the scanned image information.

FIG. 8 is a sequence diagram for describing a learning sequence of a learned model when a scanned image is printed.

First, when a file print instruction and a confidential document marking instruction are input from a user via the console unit 350 of the image forming apparatus 101 at reference numeral 801, the job control module 404 transmits training data including a job execution result to the machine learning module 431 at reference numeral 802. Then, the same processing as that indicated by reference numerals 703 to 706 in FIG. 7 is performed at reference numerals 803 to 806.

In the example of FIG. 8, learning is performed by using a file name and a described content of the file as input data, and various settings (position, orientation, color, and the like) regarding the confidential mark indicating that the file is a confidential document as output data. The learning causes the file name and the described content of the file included in the job content at the time of file printing to be input as input data to the learned model in which parameter adjustment has been completed. This enables estimation of whether the file is a confidential document.

In addition, in the embodiment, various confidential information attributes are registered for each learned model stored in the learned model storage module 433.

FIG. 9 is a diagram illustrating an example of a data table showing attributes of confidential information for each learned model stored in the learned model storage module 433 according to the embodiment.

In the data table, for each learned model, attributes such as a confidential information flag, whether input information is confidential, and whether output information is confidential are registered. Using the attributes, the machine learning processing module 430 determines whether each learned model is a model from which confidential information can be extracted. A determination method of whether it is a model from which the confidential information can be extracted will be described later.

Next, processing of resetting a learned model will be described.

FIG. 10 is a sequence diagram for describing a reset sequence of a learned model in the communication system according to the embodiment.

First, when a preliminary operation of reset of a learned model is performed by a user at reference numeral 1001, the job control module 404 is notified of the operation via the operation input module 401, the operation control module 402, and the job input module 403. The job control module 404 then requests, at reference numeral 1002, list information of learned models from which confidential information can be extracted from a confidential information determination module 435. The confidential information determination module 435 obtains, at reference numerals 1003 and 1004, learned model list information from the learned model storage module 433, and retrieves, from the list information, a learned model from which confidential information can be extracted. Then, at reference numeral 1005, the confidential information determination module 435 transmits, to the job control module 404, list information of learned models which are determined to be learned models from which confidential information can be extracted.

Due to this, at reference numeral 1006, the job control module 404 sends the list information of learned models to the display control module 406, and causes the list to be displayed on the display unit 407. Then, at reference numeral 1007, the user inputs, from the operation input module 401, a learned model that should be reset in the list. This causes the input content to be sent to the job control module 404. In response to this, at reference numeral 1008, the job control module 404 perform a reset instruction of the learned model to be reset to a learned model reset module 434 based on the input content. This causes the learned model reset module 434 to reset, at reference numeral 1009, the learned model to be reset stored in the learned model storage module 433.

The processing of resetting a learned model will now be described in detail with reference to the flowchart.

Figure 11:
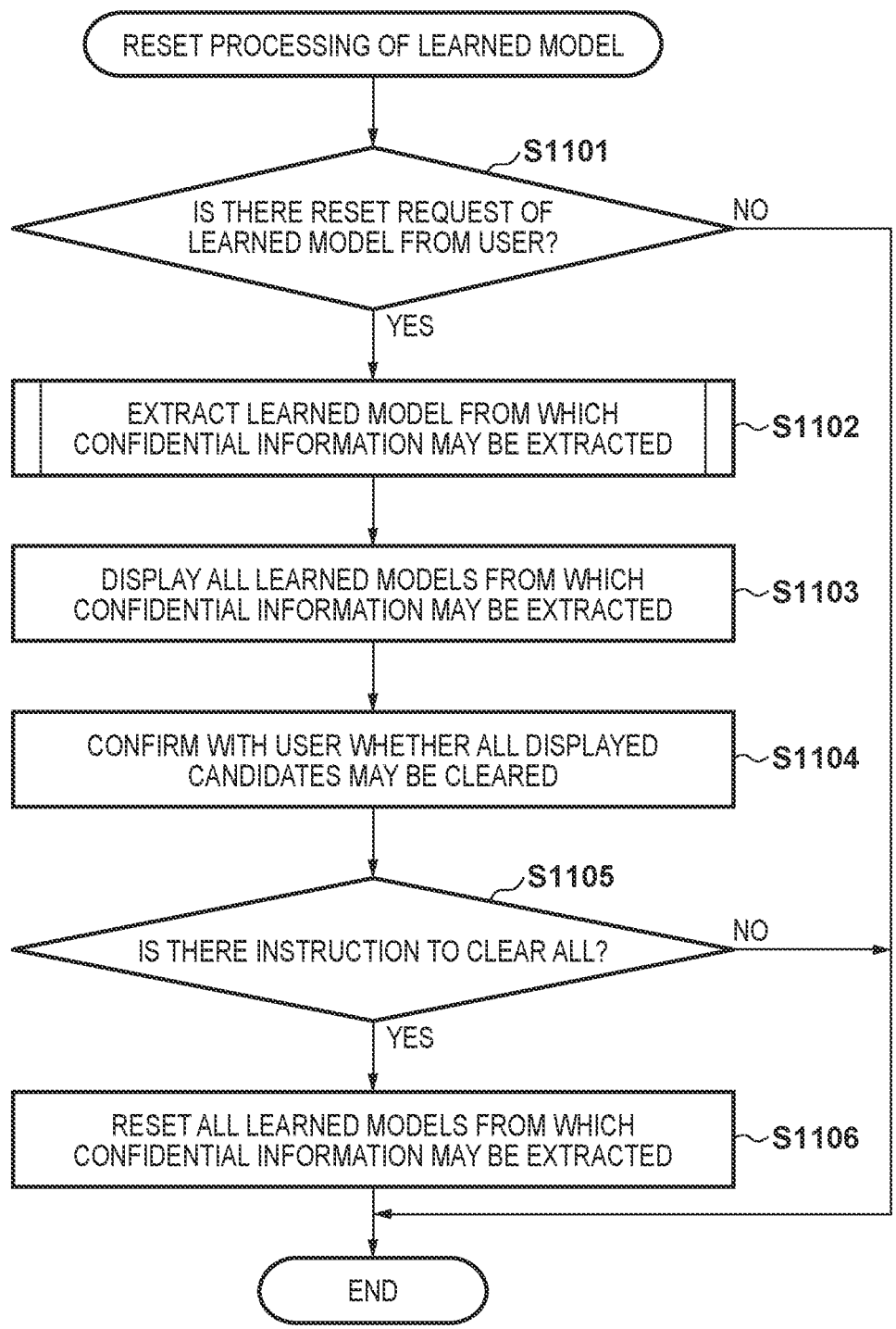
FIG. 11 is a flowchart for explaining reset processing of a learned model in the image forming apparatus according to the embodiment.

FIG. 11 is a flowchart for explaining reset processing of a learned model in the image forming apparatus 101 according to the embodiment. Note that the processing described in this flowchart is implemented by executing the program deployed onto the RAM 302 by the CPU 301.

First, in step S1101, the CPU 301 determines whether a reset request of the learned model has been input from the user via a user interface such as the console unit 350, and when it is determined that there is a reset request, the processing proceeds to step S1102. When it is determined that there is no reset request, this processing is ended. In step S1102, the CPU 301 starts an extraction of a learned model from which confidential information may be extracted.

Figure 12:
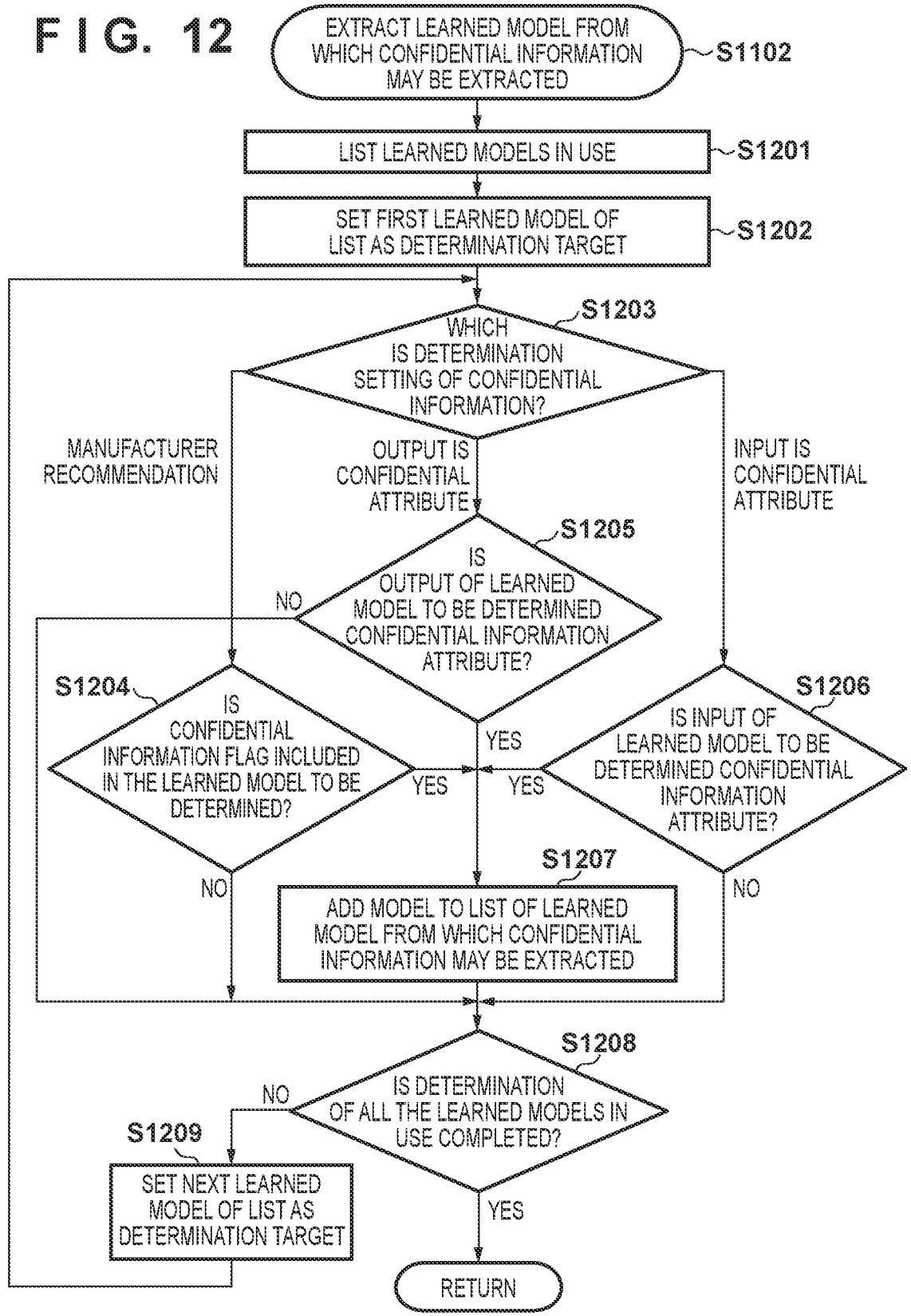
FIG. 12 is a flowchart for explaining extraction processing of a learned model from which confidential information may be extracted, in step S1102.

FIG. 12 is a flowchart for explaining extraction processing of a learned model from which confidential information may be extracted, in step S1102.

In step S1201, the CPU 301 lists learned models that are in use. Next, the processing proceeds to step S1202 where the CPU 301 sets the first learned model of the list as a determination target, and proceeds to step S1203. In step S1203, the CPU 301 reviews a setting value for determining whether or not to be confidential information and switches determination methods of whether or not the confidential information may be extracted depending on a setting value of the learned model.

If the setting value is a manufacturer recommended setting value, the processing proceeds to step S1204 where it is determined whether the learned model to be determined includes a confidential information flag "Yes". If the setting value is a confidential level setting of output data, the processing proceeds to step S1205 where it is determined whether the output data of the learned model to be determined is a confidential information attribute, that is "confidential". If the setting value is a confidential level setting of input data, the processing proceeds to step S1206 where it is determined whether the input data of the learned model to be determined is a confidential information attribute, that is "confidential".

When it is determined that the learned model to be determined is confidential in the determination of these steps S1204, S1205, and S1206, the processing proceeds to step S1207 where the model is added to the list of learned models from which confidential information may be extracted, and proceeds to step S1208. Alternatively, when it is determined that the learned model to be determined is not confidential in the determination of these steps S1204, S1205, and S1206, the processing skips step S1207 and proceeds to step S1208.

In step S1208, the CPU 301 determines whether the determination has been completed for all the learned models in use, and when the determination has not been completed, the processing proceeds to step S1209 where the next learned model of the list is set as the determination target and proceeds to step S1203. On the other hand, when it is determined that the determination has been completed for all the learned models in use in step S1208, the CPU 301 ends this processing and proceeds to step S1103 of FIG. 11.

In step S1103, the CPU 301 displays all the learned models from which confidential information may be extracted on the console unit 350 for presentation. Next, the processing proceeds to step S1104 where the CPU 301 confirms with the user whether all candidates displayed on the console unit 350 may be cleared, via the console unit 350. FIG. 13B is a diagram illustrating an example of this screen. Then, the processing proceeds to step S1105, and if there is an instruction to clear all, the processing proceeds to step S1106 where all the learned models from which confidential information may be extracted are reset and the reset processing is ended. On the other hand, if there is no instruction to clear all in step S1105, the processing ends without resetting.

Here, in the AI estimation, the criterion for determining that confidential information is included is set by the user as a setting value for determining of confidential information as described above.

Figure 13A:
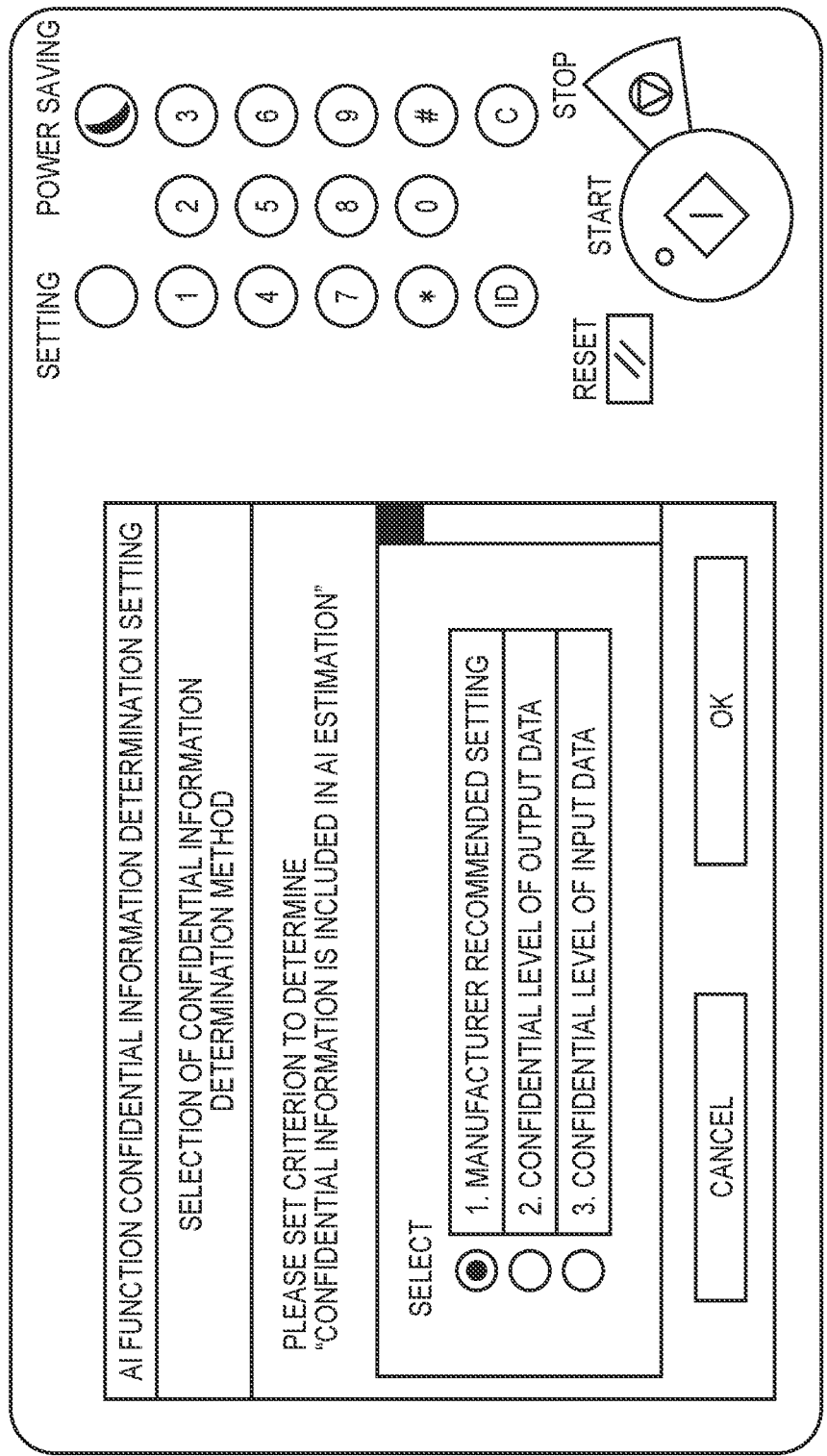
FIG. 13A is a diagram illustrating an exemplary screen for selecting a method for determining whether confidential information is included.
Figure 13B:
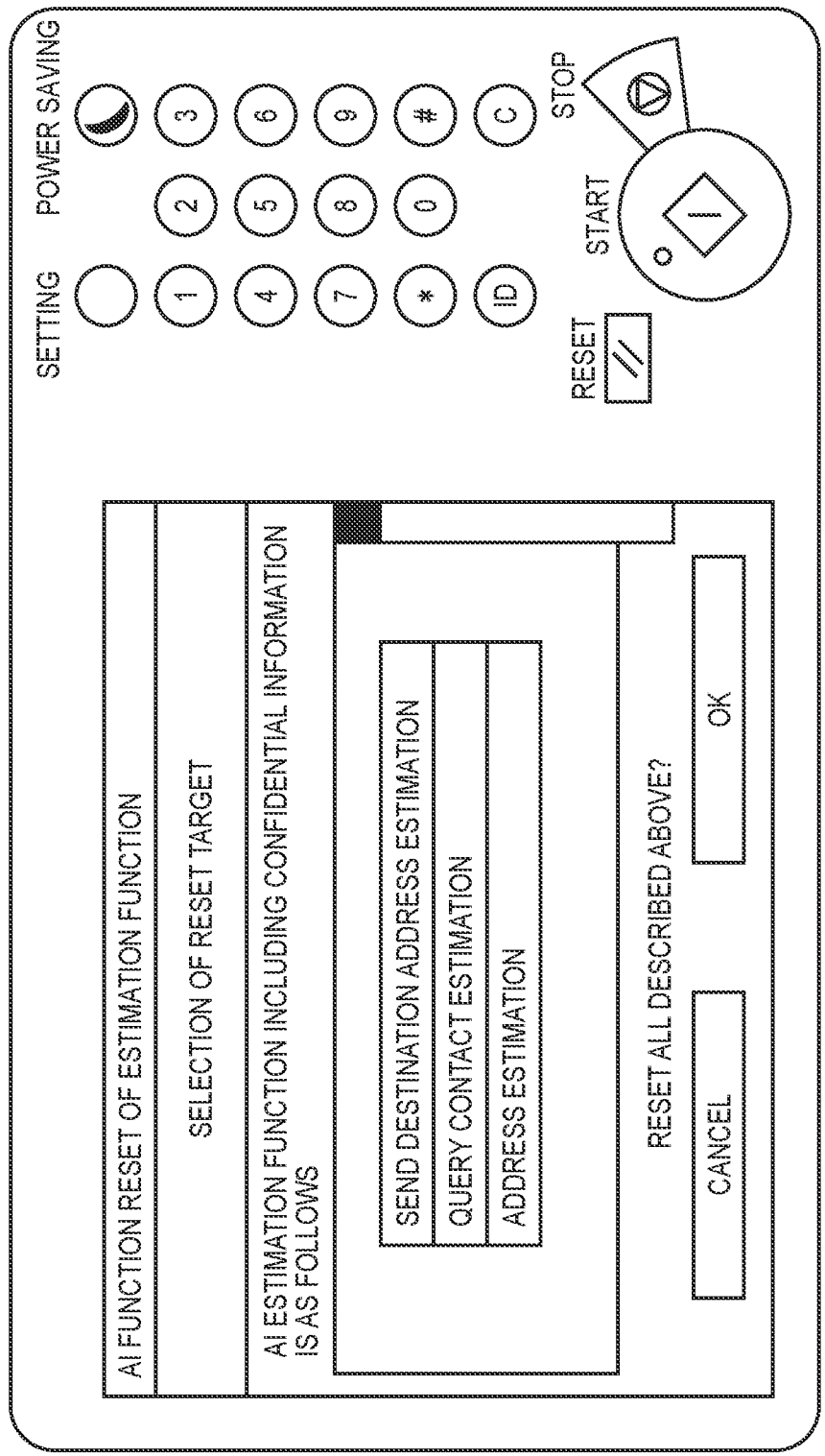
FIG. 13B is a diagram illustrating an exemplary screen for confirming with a user whether all learned models determined to include confidential information may be cleared.

FIG. 13A is a diagram illustrating an exemplary screen for selecting a method for determining whether the confidential information is included.

In FIG. 13A, the user selects and sets a confidential information determination method from among "MANUFACTURER RECOMMENDED SETTING", "CONFIDENTIAL LEVEL OF OUTPUT DATA", and "CONFIDENTIAL LEVEL OF INPUT DATA", "CONFIDENTIAL LEVEL OF INPUT DATA" corresponds to whether the input information of FIG. 9 is "confidential", and "CONFIDENTIAL LEVEL OF OUTPUT DATA" corresponds to whether the output information of FIG. 9 is "confidential". These selection candidates are merely an example and may be set using another criterion.

Figure 14A:
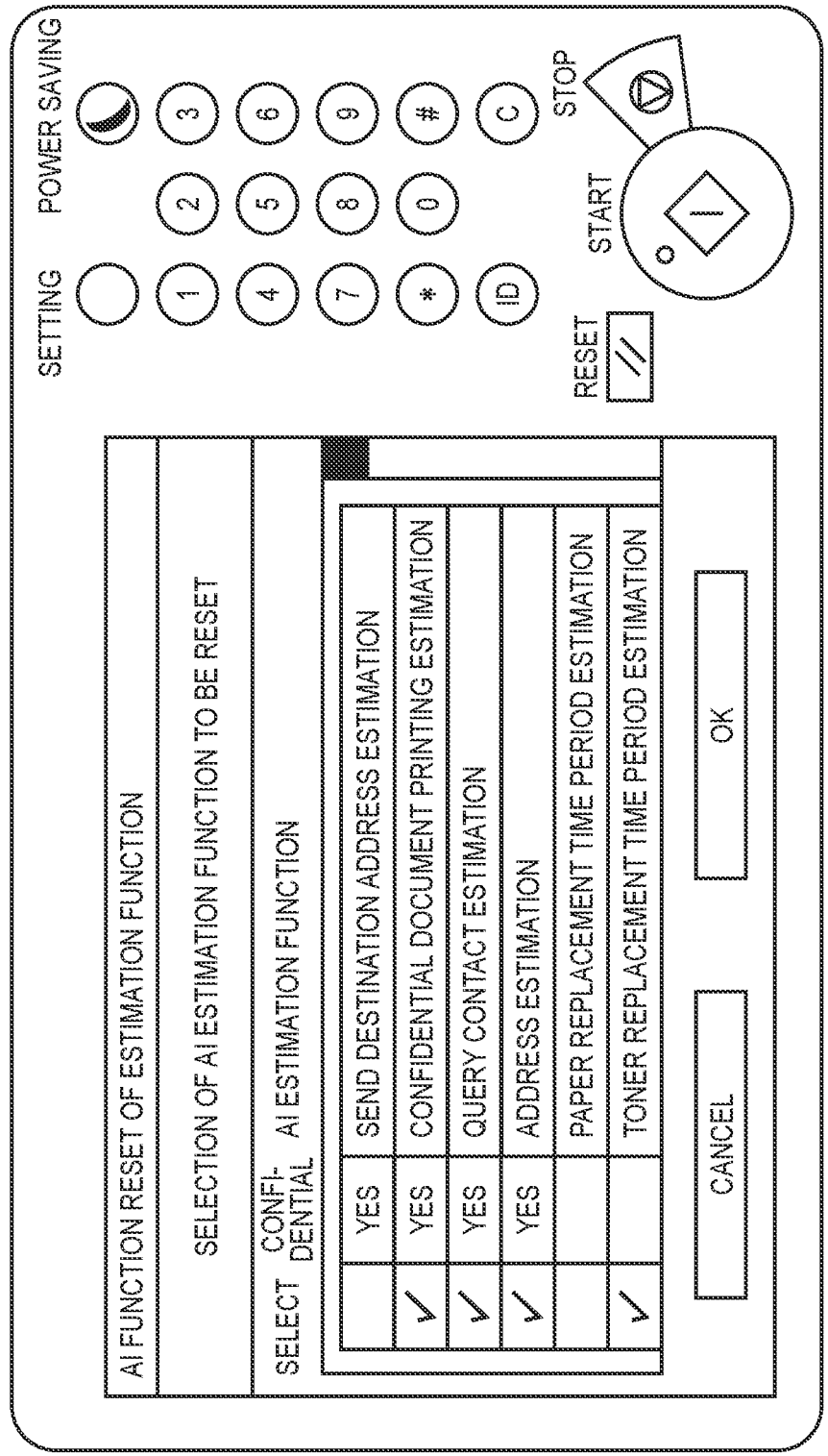
FIG. 14A is a diagram illustrating an exemplary screen on which a list of all learned models and estimated confidential information attributes thereof are displayed to allow a user to select a learned model to be reset.

FIG. 14A is a diagram illustrating an exemplary screen on which a list of all learned models and estimated confidential information attributes thereof are displayed to allow the user to select a learned model to be reset.

In this screen, the user selects a learned model to be reset and taps the OK button. This can reset only the desired learned model. In FIG. 14A, learned models for "CONFIDENTIAL DOCUMENT PRINT", "QUERY CONTACT", "ADDRESS" and "TONER REPLACEMENT TIME" are selected.

FIG. 14B is a diagram illustrating an exemplary screen on which a list of categories of pieces of confidential information is displayed to allow the user to select pieces of the confidential information that may be extracted.

Here, "NAME," "DATE OF BIRTH," and "CREDIT CARD NUMBER" are selected as pieces of the confidential information. When the OK button is tapped in this state, it is possible to specify only a learned model including these pieces of the confidential information for resetting.

FIG. 15A is a diagram illustrating an exemplary screen for setting an access authority to a learned model.

Here, access rights for "SEND DESTINATION ADDRESS" and "QUERY CONTACT" are selected. When such a selection is made, a learned model is to be generated for "SEND DESTINATION ADDRESS" and "QUERY CONTACT".

FIG. 15B is a diagram illustrating an exemplary screen that notifies a user, before starting to use a learned model that is estimated to have confidential information that may be extracted, to use the learned model.

In the example of FIG. 15B, only a learned model including the permitted "SEND DESTINATION ADDRESS" is specified to be used for the AI estimation.

Note that examples of personal information included in the confidential information include an address, name, age, date of birth, vender, hometown, phone number, family structure, blood type, career, nationality, social security and tax number, photograph, license plate number, property, status, position, security camera footage, medical history, and the like.

Furthermore, examples of the confidential information include scanned data of an original document to which a certain keyword such as "CONFIDENTIAL" or "STRICT SECRECY" is given in advance. For example, information that is owned by a company and not disclosed to the outside, information that is managed as secret information, information that may cause a loss on the company if disclosed, and the like are included in the confidential information. This also includes, for example, design drawings, various manuals, business proposal, customer information, information regarding human resources, salary information, stock/supplier lists, and the like.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD)) or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-83363, flied May 11, 2020, which is hereby incorporated by reference herein in its entirety.

What is claimed is:

1. An information processing apparatus, comprising:
a display device that displays information;
a storage that stores a plurality of learned models; and
at least one processor and at least one memory being configured to cause the information processing apparatus to:
receive a user instruction to designate one or more types of confidential information; and
cause the display device to display a result of identifying one or more learned models in which learning has been performed based on the designated types of confidential information among the plurality of learned models.

2. The information processing apparatus according to claim 1, wherein the at least one processor and at least one memory being further configured to cause the information processing apparatus to:
reset, in response to receiving an operation to reset a learned model of the one or more learned models displayed as the result of identifying, the learned model.

3. The information processing apparatus according to claim 1, wherein the at least one processor and at least one memory being further configured to cause the information processing apparatus to:
reset, in response to receiving an operation to reset all of the one or more learned models displayed as the result of identifying, all of the one or more learned models.

4. The information processing apparatus according to claim 1, wherein the at least one processor and at least one memory being further configured to cause the information processing apparatus to:
determine, in response to an instruction of transmitting image data obtained by scanning an original document, a target learned model of the plurality of learned models stored in the storage and updates the target learned model that is determined.

5. The information processing apparatus according to claim 1, wherein the at least one processor and at least one memory being further configured to cause the information processing apparatus to:
use, in response to an instruction of transmitting image data obtained by scanning an original document, the plurality of learned models stored in the storage to estimate a destination address to which the image data is to be transmitted.

6. The information processing apparatus according to claim 5, wherein the at least one processor and at least one memory being further configured to cause the information processing apparatus to:
allow a user to select a learned model to be used for estimation of the destination address,
wherein, in the estimation of the destination address, the selected learned model is used to estimate the destination address to which the image data is to be transmitted.

7. The information processing apparatus according to claim 1, wherein the at least one processor and at least one memory being further configured to cause the information processing apparatus to:
specify an attribute of the designated confidential information; and
identify the one or more learned models in which learning has been performed based on whether the plurality of learned models stored in the storage respectively include confidential information having the specified attribute.

8. The information processing apparatus according to claim 2, wherein the at least one processor and at least one memory being further configured to cause the information processing apparatus to:
allow a user to select a learned model to be reset from among the one or more learned models displayed as the result of identifying,
wherein, in the reset of the learned model, the selected learned model is reset.

9. The information processing apparatus according to claim 1, wherein the confidential information includes personal information and information held by a company and includes information that is not disclosed to outside and information managed as secret information.

10. The information processing apparatus according to claim 9, wherein the personal information includes at least any of an address, a name, and a phone number of an individual.

11. A method of controlling an information processing apparatus having a display device that displays information and a storage that stores a plurality of learned models, the method comprising:

receiving a user instruction to designate one or more types of confidential information; and causing the display device to display a result of identifying one or more learned models in which learning has been performed based on the designated types of confidential information among the plurality of learned models.

12. The method according to claim 11, further comprising:

resetting, in response to receiving an operation to reset a learned model of the one or more learned models displayed as the result of identifying, the learned model.

13. The method according to claim 11, further comprising:

resetting, in response to receiving an operation to reset all of the one or more learned models displayed as the result of identifying, all of the one or more learned models.

14. A non-transitory computer-readable storage medium storing a program for causing a processor to execute a method of controlling an information processing apparatus having a display device that displays information and a storage that stores a plurality of learned models, the method comprising:

receiving a user instruction to designate one or more types of confidential information; and causing the display device to display a result of identifying one or more learned models in which learning has been performed based on the designated types of confidential information among the plurality of learned models.

* * * * *